US010551525B2

(12) United States Patent
Harris et al.

(10) Patent No.: US 10,551,525 B2
(45) Date of Patent: Feb. 4, 2020

(54) SYSTEM AND METHOD FOR ESTIMATING THE SPATIAL DISTRIBUTION OF AN EARTH RESOURCE

(71) Applicant: CGG SERVICES SAS, Massy (FR)

(72) Inventors: James Harris, Conwy (GB); Alexandra Ashley, Conwy (GB); Simon Otto, Conwy (GB); Robert Crossley, Conwy (GB)

(73) Assignee: CGG SERVICES SAS, Massy (FR)

( * ) Notice: Subject to any disclaimer, the term of this patent is extended or adjusted under 35 U.S.C. 154(b) by 350 days.

(21) Appl. No.: 15/458,587

(22) Filed: Mar. 14, 2017

(65) Prior Publication Data
US 2018/0267205 A1 Sep. 20, 2018

(51) Int. Cl.
G01V 99/00 (2009.01)
(52) U.S. Cl.
CPC ................ G01V 99/005 (2013.01)
(58) Field of Classification Search
CPC .. G01V 99/005; G01V 99/00; G01V 2210/66; G01V 2210/661; G01V 2210/667; G01V 3/38; G06F 17/5009; E21B 43/00; G01N 33/241; G06T 17/05; G01S 17/89
USPC .......... 382/109; 702/2, 11, 13, 14, 16; 703/3
See application file for complete search history.

(56) References Cited

U.S. PATENT DOCUMENTS 6,246,963 B1 * 6/2001 Cross .................... G01V 11/00
702/14
2002/0099504 A1 * 7/2002 Cross .................... G01V 11/00
702/2
2009/0295792 A1 * 12/2009 Liu ......................... G06F 16/29
345/419
2009/0299710 A1 * 12/2009 Liu ......................... E21B 49/00
703/6
2010/0175886 A1 * 7/2010 Bohacs ................... G01V 99/00
166/369
2010/0257004 A1 10/2010 Perlmutter et al.
(Continued)

FOREIGN PATENT DOCUMENTS

WO 2009/011737 A1 1/2009
WO 2010082969 A1 7/2010

OTHER PUBLICATIONS

K. M. Bohacs, et al.; "Production, Destruction, and Dilution—The Many Paths to Source-Rock Development"; The Deposition of organic carbon-rich sediments: Models, mechanisms and consequences: SEPM (Society for Sedimentary Geology) Special Publication 82; ISBN 1-56576-110--3; 2005; pp. 61-101.
(Continued)

Primary Examiner — John E Breene
Assistant Examiner — Jeffrey P Aiello
(74) Attorney, Agent, or Firm — Patent Portfolio Builders PLLC

(57) ABSTRACT

System and method for estimating a spatial distribution of a characteristic associated with Earth resources. The method includes receiving at an interface palaeogeography data including (1) palaeotopography data, (2) palaeobathymetry data, (3) and a palaeo-earth systems model; calculating with a processor, a retrodictive model of the characteristic based on the (1) palaeotopography data, (2) the palaeobathymetry data, and (3) the palaeo-earth systems model; and imaging the spatial distribution of the characteristic over a part of the Earth.

19 Claims, 14 Drawing Sheets

(56) References Cited

U.S. PATENT DOCUMENTS

2011/0264430 A1* 10/2011 Tapscott ............... G01V 99/00
703/10
2016/0009981 A1* 1/2016 Teklu ................. E21B 43/20
166/305.1

OTHER PUBLICATIONS

B. J. Katz, et al.; Controlling Factors on Source Rock Development—A Review of Productivity, Preservation, and Sedimentation Rate; he Deposition of organic carbon-rich sediments: Models, mechanisms and consequences: SEPM (Society for Sedimentary Geology) Special Publication 82; ISBN 1-56576-110--3; 2005; pp. 7-16.
R. V. Tyson; "The 'Productivity Versus Perservation' Controversy: Cause, Flaws, and Resolution"; he Deposition of organic carbon-rich sediments: Models, mechanisms and consequences: SEPM (Society for Sedimentary Geology) Special Publication 82; ISBN 1-56576-110--3; 2005; pp. 17-33.
Extended European Search Report for related European Application No. 18305258.8, dated Aug. 20, 2018. (All references not cited herewith have been previously made of record.).
R.A. Berner et al., "GEOCARB Iil: A Revised Model of Atmospheric CO2 Over Phanerozoic Time", American Journal of Science, Feb. 2001, v. 301, p. 182-204.
J.H. Christensen et al., "Temperature Dependent Climate Projection Deficiencies in CMIP5 Models", Geophysical Research Letters, Dec. 2012, v. 39, No. 24, L24705 p. 1-5.
T.J. Crowley et al., "CO2 and Climate Change", Science AAAS, Science's Compass, May 4, 2001, v. 292, p. 870-872.
CMIP5, "Coupled Model Intercomparison Project Phase 5: World Climate Research Programme", 2012, downloaded from the Internet Mar. 15, 2017 (http://cmip-pcmdi.llnl.gov/cmip5/index.html).
P.N. Dinezio et al., "The Effect of Sea Level on Glacial Indo-Pacific Climate", Nature Geoscience, 2013, v. 6, p. 485-491, doi:101038/nge01823.
A.S. Endal et al., "Rotation in Solar-Type Stars, I, Evolutionary Models for the Spin-Down of the Sun", Astrophysical Journal, Jan. 15, 1981, V. 243, p. 625-640.
C.B. Field et al., "Primary Production of the Biosphere: Integrating Terrestrial and Oceanic Components", Science, Jul. 10, 1998, v. 281, (http://science.sciencemag.org/content/281/5374/237).
P. Kenrick et al., "The Origin and Early Evolution of Plants on Land", Nature, Sep. 4, 1997, v. 389, p. 33-39, Macmillian Publishers Ltd.
J.H. Martin et al., "VERTEX: Carbon Cycling in the Northeast Pacific", Deep-Sea Research, 1987, v. 34, p. 267-285, Pergamon Journals Ltd.
R.D. Müller et al., "Digital Isochrons of the World's Ocean Floor", Journal of Geophysical Research, Feb. 10, 1997, v. 102, No. B2, p. 3211-3214, American Geophysical Union.
K.H. Rao et al., "A Study on Cyclone Induced Productivity in South-Western Bay of Bengal during Nov.-Dec. 2000 Using MODIS (SST and chlorophyll-a) and Altimeter Sea Surface Height Observations", Indian Journal of Marine Sciences, Jun. 2006, v. 35(2), p. 153-160.
Robertson (UK) Limited, 2014, "Plate Wizard: A Phanerozoic Plate Reconstruction Tool", CGG, downloaded from the Internet Mar. 27, 2017 (http://www.cgg.com/en/What-We-Do/Multi-Client-Data/Geological/Plate-Wizard).
D.L. Royer, "CO2-Forced Climate Thresholds During the Phanerozoic", Geochimica et Cosmochimica Acta, 2006, v. 70, p. 5665-5666, Elsevier Inc.
D.L. Royer et al., "CO2 as a Primary Driver of Phanerozoic Climate", Geological Society of America Today, Mar. 2004, v. 14, No. 3, p. 4-10.
C.R. Scotese et al., "Computer Model of Paleoclimate Predicts Coastal Upwelling in the Mesozoic and Cainozoic", Geobyte, 1986, v. 1, p. 28-42.
M. Tripathy et al., "Modulation in Ocean Primary Production Due to Variability of Photosynthetically Available Radiation Under Different Atmospheric Conditions", Int. J. Oceanography, 2014, p. 1-12, Hindawi Publishing Corporation.
K. Tsuchiya et al., "Typhoon-Driven Variations in Primary Production and Phytoplankton Assemblages in Sagami Bay, Japan: A Case Study of Typhoon Mawar (T0511)", Plankton and Benthos Research, 2013, v. 8, No. 2, p. 74-87.
B.N. Harris, "The Deposition of Organic-Carbon-Rich Sediments: Models, Mechanisms and Consequences", SEPM Special Publication 82, 2015, pp. 282, SEMP (Society for Sedimentary Geology).

* cited by examiner

Post-rift/drift configuration     Pre-rift/drift configuration

FIG. 13

| | | | |
|---|---|---|---|
| 1 | STEP 2 EXPORT PRODUCTIVITY (gC/m²/year) | Classification of MERLIN + step 2 export productivity | Low (0-50 gC/m²/year), 1; Moderate (50-90 gC/m²/year), 3; High (>90 gC/m²/year), 5; |
| 2 | SOLUBILITY OF OXYGEN (μmols/kg) | Classification of the palaeo-solubility of oxygen at the sea surface | Low (<200 μmol/kg), 0 Moderate (200-300 μmol/kg), 1; High (>300 μmol/kg), 3 |
| 3 | WATER COLUMN VENTILATED IN MIXED LAYER TO SEA BED | Application of the mixed layer ventilation at the sea bed grid to highgrade regions that are not ventilated to the seabed at any point throughout the year | Ventilated, 0; Not ventilated, 1. |
| | | | → Global Anoxia potential (Score 1-9) |
| | | | + |
| 4 | SALINITY STRATIFICATION | Highgrading of basins where salinity stratification may contribute to the development of anoxia using the "Months: Salinity difference >=3.5‰" grid. | 1-3 months, 0; 4-8 months, 1; 9-12 months, 2; |
| | | Anoxia Potential | → Very Low, 1; Low, 2-3; Low-Moderate, 4; Moderate, 5-6; Moderate-High, 7-8; High, 9-10; Very High, 11. |

SYSTEM AND METHOD FOR ESTIMATING THE SPATIAL DISTRIBUTION OF AN EARTH RESOURCE

BACKGROUND

Technical Field

Embodiments of the subject matter disclosed herein generally relate to methods and systems and, more particularly, to mechanisms and techniques for imaging past and present day spatial distributions of an Earth resource, e.g., petroleum source rocks, without which a viable petroleum system and thus productive oil and gas fields cannot exist.

Discussion of the Background

Marine seismic data acquisition and processing generate a profile (image) of a geophysical structure under the seafloor. This image is generated based on recorded seismic data. The recorded seismic data includes pressure and/or particle motion related data associated with the propagation of a seismic wave through the earth. While this profile does not provide an accurate location of oil and gas reservoirs, it suggests, to those trained in the field, the presence or absence of these reservoirs. Thus, providing a high-resolution image of geophysical structures under the seafloor is an ongoing process. The image illustrates various layers that form the surveyed subsurface of the earth.

In frontier basins and in underexplored basins, source rocks (source rocks are those from which hydrocarbons have been generated or are capable of being generated) are poorly imaged with the above discussed methods and are hard to identify. In frontier and underexplored basins, exploration wells are few in number, or have not been drilled in optimal locations and may be lacking altogether. The source rocks are therefore not sampled, and furthermore, are not characterized by seismic methods. Consequently, source rocks and an associated hydrocarbon charge is a key exploration risk in these basins. The prediction or rather retrodiction of source rocks is therefore a valuable goal.

Thus, there is a need to address these shortcomings of the established methods and generate a model that more accurately predicts the spatial distribution of source rocks. In the past, various attempts have been made to predict source rocks, but these efforts have been concentrated on the production of organic matter (OM) in upwelling zones and have not included a quantification of the other processes that control source rock distribution and quality.

Accordingly, it would be desirable to have systems and methods that refine/improve the imaging of the source rocks spatial distribution.

SUMMARY

According to an embodiment, there is a method for estimating a spatial distribution of a characteristic associated with Earth resources. The method includes receiving at an interface palaeogeography data including (1) palaeotopography data, (2) palaeobathymetry data, (3) and a palaeo-earth systems model; calculating with a processor, a retrodictive model of the characteristic based on the (1) palaeotopography data, (2) the palaeobathymetry data, and (3) the palaeo-earth systems model; and imaging the spatial distribution of the characteristic over a part of the Earth or the entire Earth.

According to another embodiment, there is a computing device for estimating a spatial distribution of a characteristic associated with Earth resources. The computing device includes an interface for receiving palaeogeography data including (1) palaeotopography data, (2) palaeobathymetry data, (3) and a palaeo-earth systems model; and a processor connected to the interface. The processor is configured to calculate a retrodictive model of the characteristic based on the (1) palaeotopography data, (2) the palaeobathymetry data, and (3) the palaeo-earth systems model, and image the spatial distribution of the characteristic over a part of the Earth.

According to still another embodiment, there is a non-transitory computer readable medium including computer executable instructions, wherein the instructions, when executed by a computer, implement a method for estimating a spatial distribution of a characteristic associated with Earth resources, the method including the steps noted above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 13 illustrates a risking process used to categorize the anoxia potential.

DETAILED DESCRIPTION

Figure 1:
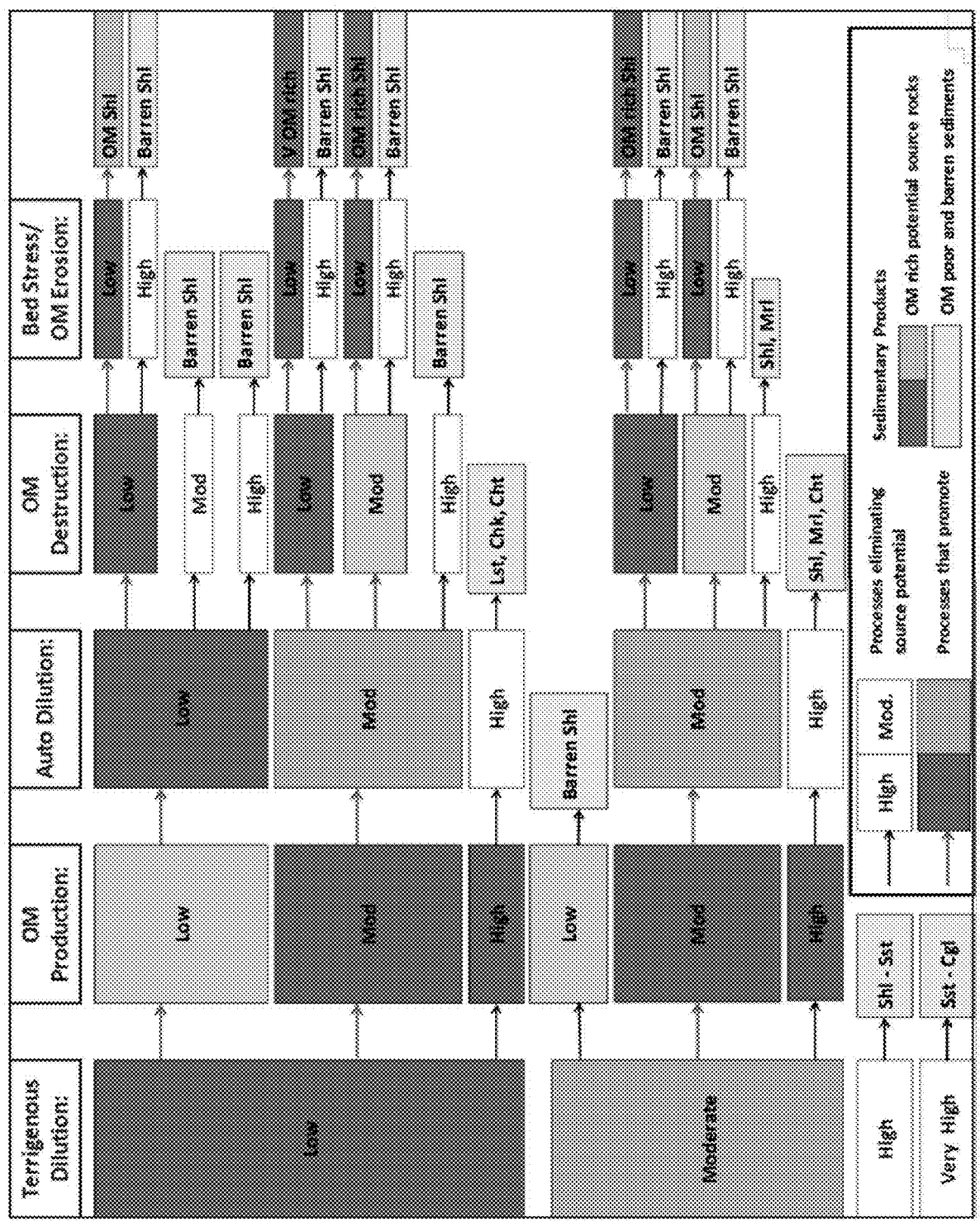
FIG. 1 illustrates five sets of processes that control the accumulation of organic matter rich sediments to form petroleum source rocks.

The following description of the exemplary embodiments refers to the accompanying drawings. The same reference numbers in different drawings identify the same or similar elements. The following embodiments are discussed with regard to a method for estimating hydrocarbon reservoir rock, or source rocks, which are the source of economically valuable oil and gas resources in both conventional and unconventional accumulations. However, the methods developed herein could be used not only for the prediction of marine source rock environments but for other Earth resources; the methods discussed herein have additional applications, ranging from modelling/quantification of particulate organic carbon sequestration in marine sediments (part of the carbon cycle) at one extreme, to use of the palaeogeographic and palaeoclimatic model results (required for the source rock predictions method) to put any deep time concept or problem in context. The global calculation of sediment flux from ancient river systems is also a part of that methodology. In one embodiment, it is possible to predict the distribution of diamond placer deposits (this method could also be applied for certain gold as well or other minerals). Thus, the following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a quantification of other processes (in addition to the production of organic matter (OM) in upwelling zones) that control source rock quality is considered, as for example, OM productivity by storm induced supply of nutrients to the photic zone, variation seasonally and latitudinally in available sunlight, OM destruction and OM dilution. These features, which are not fully considered by the existing models, are addressed herein by using combined global palaeogeographic mapping and palaeo-Earth systems modelling with an understanding of the processes involved to make quantitative predictions of the distribution of source rock quality. In one specific implementation, this is achieved by using a novel ArcGIS based methodology (ArcGIS is a software produced by ESRI, Redlands, Calif., United States). Those skilled in the art would understand that the principles discussed herein are applicable, to any software implementation, and ArcGIS is used as an example.

Modelling the distribution of productivity in ancient seas is a basic requirement for predicting the lateral variation in source rock quality; it is one of the main uncertainties for exploration in frontier basins, and is also required in the modelling of the carbon cycle in deep time. To construct a predictive tool designed to address this problem, a multi-faceted approach based on palaeogeographic mapping integrated with Earth-systems modelling has been devised and Plate Wizard™ (Plate Wizard is a software platform own by Robertson, a division of CGG, which accurately reconstructs the position and interaction of the Earth's tectonic plates and geological datasets) reconstructions were used as the basis for global palaeogeographic mapping. Detailed palaeotectonics and palaeoenvironments maps were prepared using a global database of palaeoenvironmental and lithofacies data. A novel method (to be discussed later) relating the topography and bathymetry to plate tectonic environments was used in the construction of palaeo digital elevation models (DEMs) and these DEMs were coupled to a palaeo-Earth systems model (e.g., the UK Met Office HadCM3 palaeo-climate model; other existing models may be used). The database also included climate proxies that were used to test the veracity of modelling results. Both upwelling and storms are major factors in the supply of nutrients to the photic zone and low light levels are a significant seasonal limit on primary productivity, particularly at high latitudes. An upwelling zone is an oceanographic phenomenon that involves wind-driven motion of dense, cooler, and usually nutrient-rich water towards the ocean surface, replacing the warmer, usually nutrient-depleted surface water. These model results are used in a routine that also models the destruction and preservation conditions that can result in the accumulation of organic rich sediment on the seabed, which together with burial and maturation, will constitute a petroleum source rock.

To predict, or rather retrodict (estimate a past state from present recorded data using a model), the distribution of organic rich potential source facies is a difficult but valuable goal for hydrocarbon exploration, particularly in frontier or little explored basins. Because there is little hard data in these basins that would allow the identification and characterization of source rocks, a modelling approach is needed. This approach is now discussed in more detail and it has direct implications for the role of marine particulate organic matter sedimentation and preservation in the carbon cycle of the deep past.

Palaeogeographic and temporal variations in global palaeoenvironments and the stratigraphic distribution of known source rocks were factors in the selection of 18 time slices (Mid Miocene, Serravallian-Early Silurian, Aeronian) that have been compiled for this project. Mapping, modelling, testing and the application of the predictive methodology described here was undertaken for each time slice. A sub-set of the available time slices representing a range of Palaeozoic-Cenozoic palaeogeographies and both hot-house and ice house climates are used to check this approach and to illustrate the predictive results.

Construction of a Predictive Model

To build a predictive model (more accurately a retrodictive model because this model estimates a past state of the Earth from models built on present recorded data) for source rocks, an understanding of the main processes that are responsible for the accumulation of organic rich sediments is desired. However, this is a complex, multi-disciplinary, problem and as such, various, seemingly conflicting schemes have been proposed in the past. The controversy surrounding the relative roles of organic matter (OM) production versus preservation in the accumulation of source prone sediments has, in large part, been rationalized. The two opposing arguments, the preservation stance and the productivity view-point, have been rationalized in a series of papers in Harris (2005); mainly Katz (2005), Bohacs et al., (2005) and Tyson (2005). These papers conclude that the overriding principal is the interplay, as illustrated in Bohacs et al. (2005, their Table 1 and FIG. 1) of three main controls: OM productivity, OM preservation, and OM dilution.

To implement the modelling approach used here, the scheme in Bohacs has been used, but both the OM preservation and dilution elements have been sub-divided in a novel way. For OM preservation, the present approach has differentiated the chemical environment that controls the rate of OM oxidation/re-mineralization and the physical environment responsible for the physical erosion and transport of particulate OM (the lowest density, commonly occurring sediment fraction) at the sea bed.

OM dilution represents the relative rate of accumulation of OM versus terrigenous mud and/or biogenic silica or carbonate. This was termed the OM-free mass sediment accumulation rate by Tyson (2005) and usually contributes most to the gross rock volume of a source rock. Different processes control the rate of terrigenous sediment accumulation and the rate of accumulation of biogenic sediments. Terrigenous mud is dependent on the rate and grade of sediment supply and the current energy environment at the sea bed. Biogenic silica and carbonate are the hard parts (tests, shells and skeletal framework) of organisms, some of which are responsible for the majority of OM productivity. It represents an auto-dilution process, largely controlled by temperature, water depth and nutrient supply. This is difficult because these are largely the same processes that also control the rate of OM productivity.

The model discussed herein, therefore, may include five sets of controlling processes, which are illustrated in FIG. 1, some of which have been successfully modelled as:
  OM dilution by terrigenous mud,
  OM productivity in the photic zone,
  OM auto-dilution,
  OM destruction in the water column and at the sea bed, and
  OM erosion/physical transport.

The model was generated with the goal of achieving a predictive methodology that would define source rock depositional space. This means the areas of the ancient sea bed where a combination of the five processes outlined above could result in the accumulation and preservation of organic-rich sediment (represented in $gC/m^2/yr$). In addition, a methodology for the prediction of dysoxia and anoxia, which impacts OM preservation, have also been developed, as will be discussed later.

The processes outlined above represent a combination of geographic, climatic and oceanographic (physical, chemical and biological) constraints on OM accumulation and preservation. The palaeogeographic environment including the topographic controls on climate and run-off and bathymetric controls on ancient oceans were provided by detailed, data constrained palaeogeographic mapping. Palaeogeography in this context has two functions: it provides the surface boundary conditions for palaeo-Earth systems models (PESM) and is also used to apply and test the model results. The climatic and oceanographic parameters were derived from a coupled ocean/atmosphere PESM (e.g., UK Met Office HadCM3). ArcGIS based mapping and modelling were used to construct the palaeogeographies process and display the PESM results. Novel methods (to be discussed later) were developed to implement and test the predictive model. Although this disclosure refers to specific software programs, e.g., UK Met Office HadCM3 or Merlin (a software platform that interacts with Plate Wizard, also owned by Robertson), those skilled in the art would understand that the novel methods to be discussed are not limited by these software programs and these methods may be used with any existing geological software.

An extensive palaeogeographic mapping and climate proxy database was compiled for this project; it includes palaeogeographic mapping controls (palaeoenvironment and lithofacies) and palaeoclimate proxies used in checking the veracity of palaeo-Earth systems model results. These data were derived from various sources, for example, published sources, Robertson's (CGG, France) legacy data set of petroleum geological studies and an extensive source rocks database derived from the Frogi geochemical database. The palaeogeographies can be built on Plate Wizard™ reconstructions, guided and constrained by the global geological database. The palaeo-Earth systems (palaeoclimate) model can be the UK Meteorological Office HadCM3 model.

In summary, the factors considered in deriving the novel methods included: (1) a global approach/reach, (2) objectivity: project based on data, (3) detailed palaeogeographic mapping for 18 time slices from the Early Silurian-recent, (4) incorporation of palaeo-Earth systems (palaeoclimate) models to capture the range of Palaeozoic-Recent hot-house and ice-house climates, and (5) the use of climate proxy data in checking the veracity of palaeo-Earth systems model results.

Modelling Marine Palaeo-Productivity

Work on atmospheric circulation, upwelling, and organic-rich rocks by Parrish and Curtis (1982) and Parrish (1982) used palaeoclimate and palaeogeography as tools in source rock exploration. These references developed a conceptual model for the Phanerozoic distribution of wind driven coastal upwelling zones, based on a qualitative comparison with the pattern of modern climate systems, as a means of predicting areas with high source rock potential. This was an important step but was a qualitative, manual method rather than a quantitative understanding of climate dynamics. Barron (1985) first applied numerical climate modelling to the prediction of wind driven coastal upwelling as the main process in source rock prediction. This type of approach was computerized by Scotese and Summerhayes (1986), again concentrating on predicting upwelling, and a modified form was used by various oil companies, including BP (Miller, 1989). In the early 1990s, computer-based dynamic climate models known as general circulation models (GCMs) were more widely available and conceptual models began to be replaced, although the emphasis was still limited to the prediction of oceanic upwelling (Kruijs and Barron, 1990). A summary of the history of these developments is included in Summerhayes (2015).

The availability of sophisticated coupled ocean/atmosphere GCMs (O/A GCM) such as the UK Met Office HadCM3 model means that a robust and well tested model is available for application to the deep past. The construction of detailed data-constrained palaeogeography designed to minimize or at least constrain this key area of uncertainty is also possible now that global mapping control data points can be derived. Upwelling as a source of nutrient supply to the photic zone is not limited to coastal wind driven processes that were emphasized in the pioneering work, but can be more effectively derived from the vertical component of oceanic circulation that is a component of the O/A GCM. In addition, HadCM3 also produces net solar radiation values and storminess that have not been used previously for predictive modelling. These advances on the earlier pioneering work are incorporated into the method that is described below.

Palaeogeography

Palaeogeography (which is the study of the detailed distribution of land, sea, mountains and depositional environments in the deep past and mapping of those features for chosen time slices in Earth history) underpins most aspects of source rock prediction and particularly the use of palaeoclimate, where palaeotopography (the topography of a given area in the geologic past) and palaeobathymetry (the bathymetry of a given ocean bottom in the geologic pas) serve as boundary conditions. Detailed palaeogeographic mapping was therefore designed to provide these boundary conditions and to facilitate application of the predictive results. The combined requirements demanded that state-of-the-art GIS techniques should be developed for the compilation and manipulation of digital maps and associated data control.

Plate Reconstructions: Base Maps for Mapping

Figure 2A:
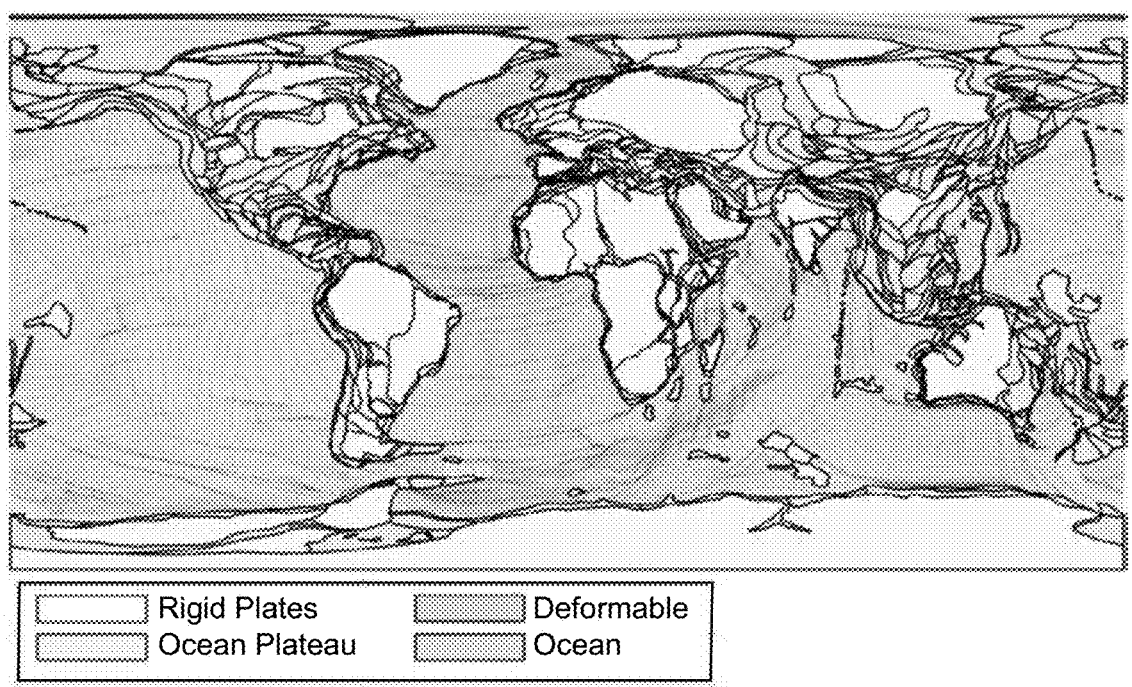
FIG. 2A illustrates a deformable plate model and FIG. 2B illustrates an application of the deformable plate model.
Figure 2B:
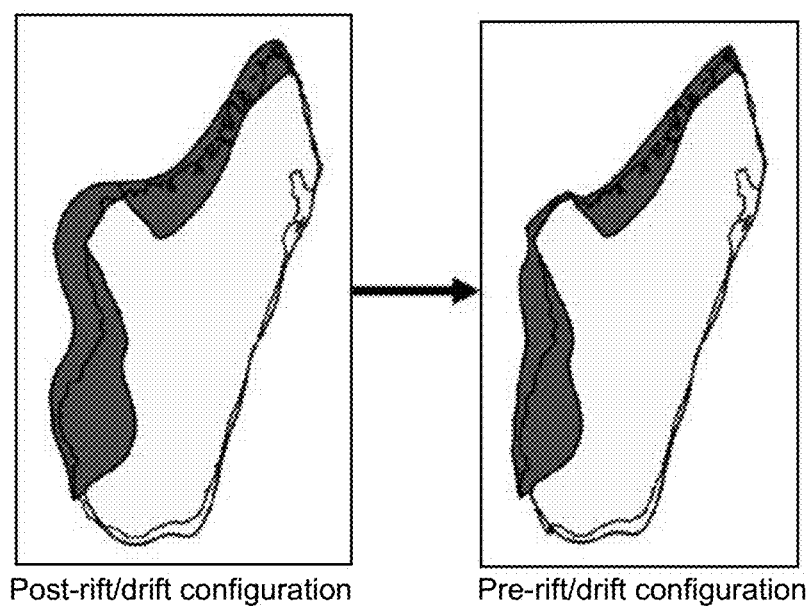

The accuracy of plate reconstructions has a direct effect on palaeogeographic mapping and therefore the topographic and bathymetric boundary conditions for palaeo-Earth systems modelling. Consequently, plate reconstructions have a direct effect on the model results and their application in source facies and sediment flux prediction. Plate reconstructions may be derived using Plate Wizard™, which is a plate tectonic model and ArcGIS' extension that reconstructs and predicts positions and geometries of 'rigid' and 'deformable' tectonic plates of the Earth for the Phanerozoic as illustrated in FIGS. 2A-2B. FIG. 2A shows various plateaus and FIG. 2B shows an example (Madagascar) of the extensional deformable plate model. This global plate model was compiled by reference to an extensive structural geology database.

Given the importance of plate reconstructions for palaeogeographic mapping, uncertainty with plate boundary definitions, plate positions (including palaeolatitude) and in particular the timing of collisional events and rift/drift transitions is an important problem. For the Cenozoic and most of the Cretaceous, the extant oceanic isochron data constrains the model and the plate reconstructions are robust. For older time slices, uncertainty with the plate model becomes progressively more important. Virtually all evidence of pre Middle to Jurassic oceanic configurations have been lost, consumed in subduction zones or obscured by large igneous provinces (LIPs). As such, the plate model is constrained by the interpretation of palaeomagnetic data and reliability on a scale of 1 (very poor) to 5 (excellent) has been assessed in a series of age classes for each plate.

For 550-440 Ma (million years ago), palaeomagnetic data is the basis for much of the interpretation. These data are often questionable, debatable or poor in quality and quantity. However, palaeomagnetic interpretations for one plate can sometimes be used for neighbouring plates. For example, the motion of Gondwana throughout the 550 to 440 Ma time period is constrained by African palaeomagnetic poles which are much more numerous than, for example, Antarctica. Therefore, the Gondwanan fragments score a cumulative 4 despite the fact that certain parts of the supercontinent, if separated, would individually score lower. The Eurasian plates are scored between 3 and 1.

The reliability of the data between 440 and 250 Ma is better and it is noticeable that Laurentia, Baltica and Siberia, and their associated plates have an increased ranking due to better coverage of palaeomagnetic interpretations. Further improvement in the ranking between 440 and 250 Ma is achieved by the continuous positive feedback from Robertson's palaeogeography work (Merlin+) into the Plate Wizard geological model, leading to a better understanding of what is, and, more importantly, what is not feasible within the base palaeomagnetic data. The majority of plates have been assigned a score of 4 although Eastern Eurasian plates are scored between 3 and 1.

For the time period between 250 and 160 Ma, data quality for the rotation parameters improves considerably, due to fuller coverage of palaeomagnetic and palaeogeography data globally. The majority of plates have been assigned a score of 5, although Eastern Eurasian plates are scored between 4 and 3. In the time period between 160 and 0 Ma, the availability of ocean isochron data allows increased accuracy in the model and nearly all the continental plates have been assigned a score of 5.

The Plate Wizard™ has been designed to address some of the main problems associated with rigid plate models. In contrast with most plate models that use exclusively rigid plates, it has been built to model deformation at plate margins. In extensional environments fitting the present-day geometry of rigid plates together causes overlap and under fit problems. To address these problems, Plate Wizard™ models the deformation of the Earth's continental plates at plate boundaries. The software also allows the reconstruction of intersected and geo-referenced raster/ArcGIS compatible datasets. This operates by calculating displacement grids that are used to deform extensional plates to their pre-rift geometries and therefore solves data overlap problems. The result is a deformable plate method that provides robust extensional plate reconstructions with reconstructed data points that preserve their depositional spatial relationships that can then serve as base maps for palaeogeographic mapping as illustrated in FIGS. 2A and 2B.

Figure 3A:
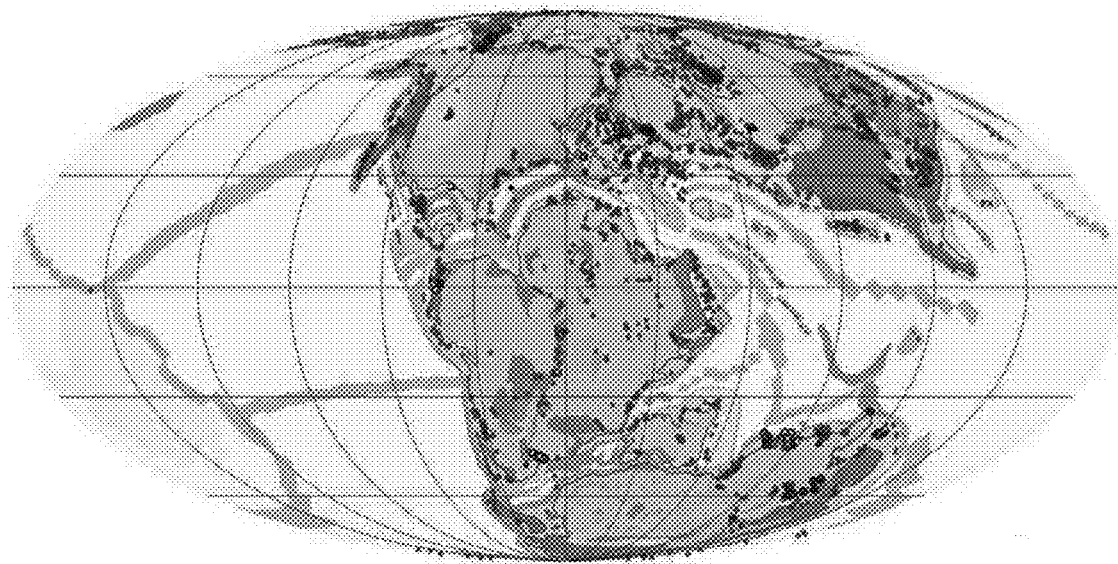
FIG. 3A illustrates the Early Cretaceous, Valanginian (135 Ma) gross depositional environment (GDE) mapping with distribution of mapping control data points
Figure 3B:
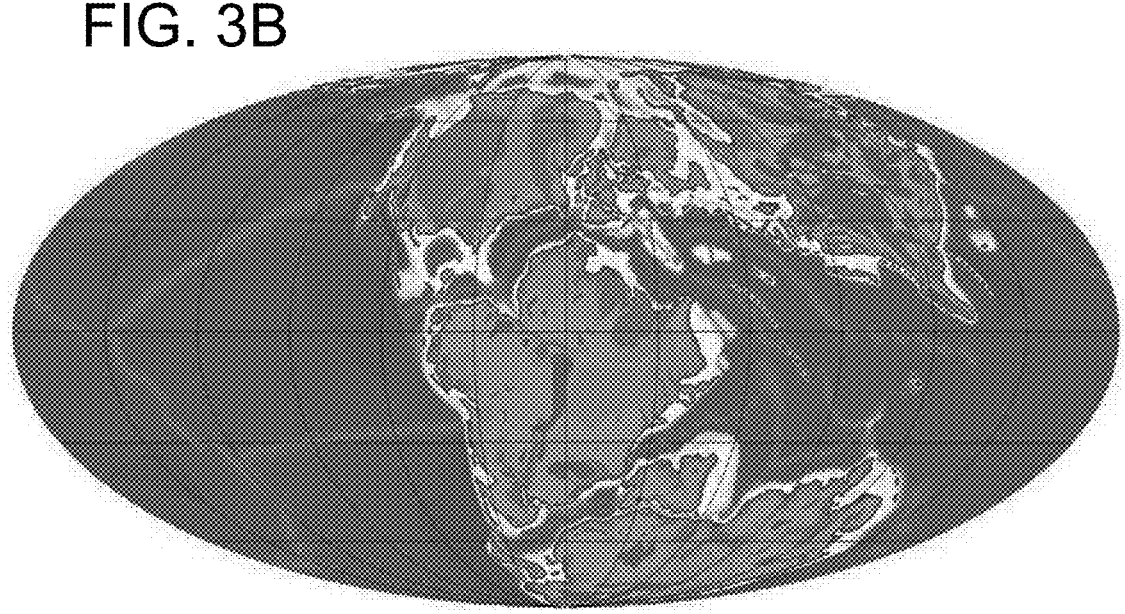
FIG. 3B illustrates the Valanginian topography and bathymetry that is required for palaeo-earth systems modelling.

Mapping Palaeoenvironments and the Derivation of Palaeotopography and Bathymetry Map elements were combined to create tectonics and gross depositional environments (GDE) and related topography and bathymetry, for each time slice, as illustrated in FIGS. 3A and 3B. In this regard, FIG. 3A shows the Valanginian GDE mapping with distribution of mapping control data points for 2617 geological sites and 266 geochemistry sites while FIG. 3B shows the Valanginian topography and bathymetry and the surface boundary conditions for palaeo-Earth systems modelling. The GDE maps are based on data rather than models, and there is a clear distinction between features that are controlled by data and map elements resulting from the interpretative extrapolation required to create complete global maps. The origin of data and the reliability of the combined dataset used in the compilation of the maps are also recorded. In order to test the climate model results, comparison with climate sensitive palaeoenvironmental data (climate proxies) may be performed. These data have therefore also been compiled as part of each time slice dataset as illustrated in FIG. 3A.

The palaeotopography and bathymetry maps have been designed using a uniformitarianist approach. They represent the surface boundary conditions for palaeoclimate and palaeotidal modelling and as such, the bathymetric and topographic contours were chosen to define the past distribution of the main physiographic elements of the Earth as illustrated in FIG. 3B.

These maps were created using the following criteria:

The palaeoenvironmental and physiographic terrains defined in FIG. 3A imply an elevational range based on the observed relationship between Present Day tectonic environments and elevation.

The assumption that present day observed relationships between elevation and tectonic environment also apply to the past.

Longevity of orography—based on the principles of isostatic uplift and theoretical erosion rates; once established, orography generally takes a considerable time to be removed by erosion, assuming isostatic equilibrium, and that no additional tectonic processes are imposed.

Figure 4:
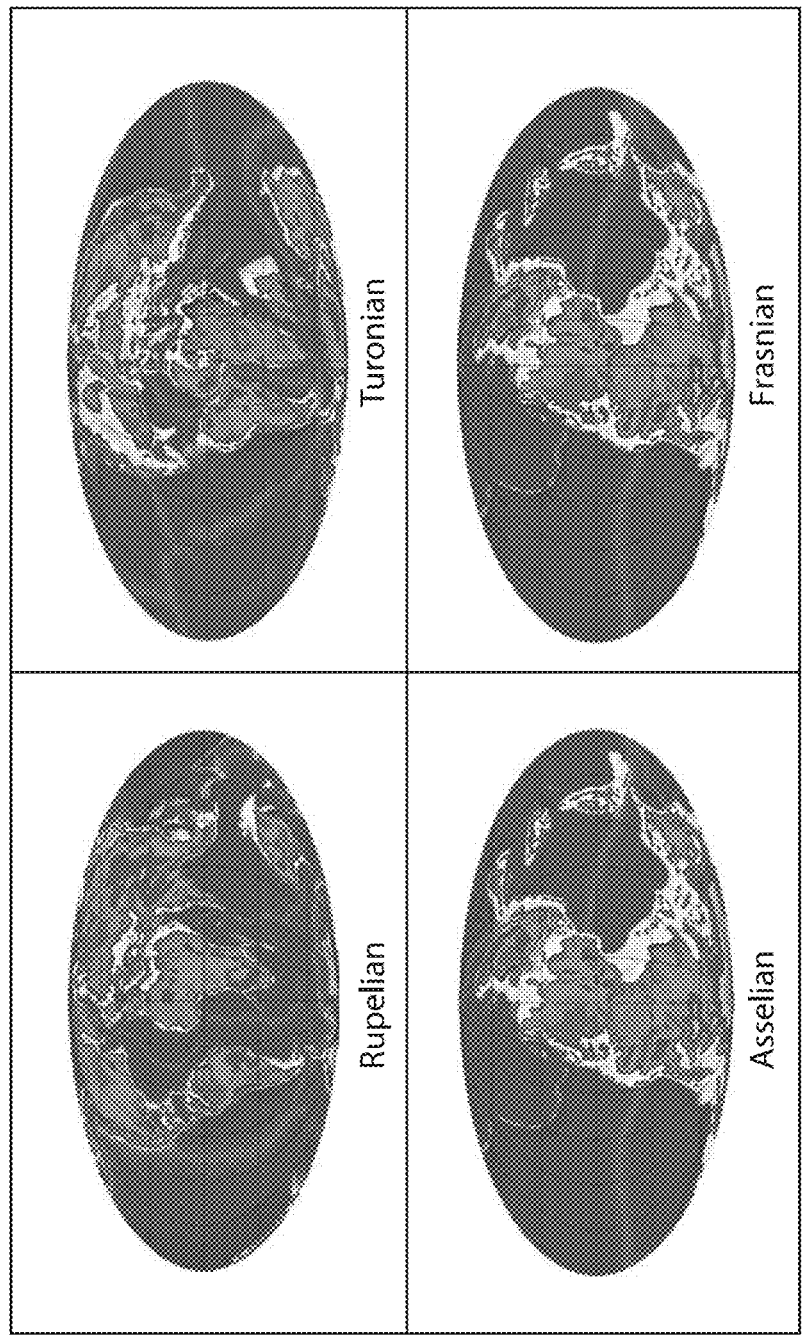
FIG. 4 illustrates various palaeotopography and bathymetry features of the Earth at different times in Earth history.

Continuity of orography—the palaeotopography depicted for any time slice needs to be consistent with that shown on preceding and subsequent time slices, allowing for the effects of erosion and tectonics (see FIG. 4 which shows palaeotopography and bathymetry examples.

Age/depth relationship for oceanic crust—that depth in the ocean is definable using the cooling curves derived for the present oceans.

Geological evidence—the topography drawn needs to be consistent with that implied by the geological record such as grain size and mineralogical maturity of sediments, provenance studies, fission track data, sedimentological and palaeoenvironmental indicators of relative relief/depth.

This approach is not without problems, mainly because modern orography is rarely a consequence of a single tectonic environment. In addition, there is frequently a lack of lithological control and for pre-Jurassic geographies there is a major uncertainty in mapping oceanic elements because almost all pre-Jurassic oceanic crust has been consumed by subduction. However, using this rule-based approach, palaeotopography and palaeobathymetry can at least be mapped consistently.

Palaeotopography

The physiographic terrains mapped for each time slice (see FIG. 3A) were also identified for the present day and were mapped globally. The area/elevation relationship of each terrain type at the present day was then calculated to provide elevational constraints for mapping. Physiographic terrains mapped with respect to plate tectonic environments on each time slice were assigned an elevational range based on the present-day elevation data for that terrain type. Topographic maximum and minimum values were interpreted for each area by using the notions of continuity and longevity of orography. This approach provides constraints such that topographic contours can be constructed for the entire map area for each time slice (see FIGS. 3A and 3B). The mapped topography was then used to define drainage basins. These are used for the PESM and have implications for the modelling of run-off and the prediction of clastic sediment flux.

Topography and associated drainage basins are key uncertainties that are difficult to quantify. The assumption that the topography of the various physiographic terrains at the present day are indicative of the topography of the same physiographic terrain types in the deep past is reasonable (see FIG. 3A) and wherever there is data such as deltaic sediments or sand rich shoreline sediments rather than carbonates, these data have been used to guide the construction of palaeo-drainage basins and to map river mouth positions. It is the extent and topography of the drainage basins and the location of major river mouths that are the main controls on run-off that is modelled for each drainage basin rather than the precise route of palaeo-rivers.

Palaeobathymetry

The palaeoshoreline, shelf-slope break, the foot of the continental rise and also the extent of Mid-Ocean Ridges (MORs) can be constructed as elements of the GDE maps (see FIG. 3A) and automatically define the 0, −200, (−300 in hot house/high-stand time slices) and −4000 m isobaths respectively. Shelf and epeiric sea isobaths were mapped by interpolation between depth related data points (e.g., reefs/bioherms and deep basinal muds) and the continental rise was auto-contoured (see FIG. 3B).

For much of the Cretaceous and Cenozoic, the oceanic isochrones retain an independent record of palaeo-depths, based on the age/depth relationship of oceanic crust established by Kearey and Vine (1990). This model of the subsidence history of cooling oceanic crust assumes no secondary heating, post-emplacement, but provides an adequate model for the mapping of oceanic crust for post-Cretaceous time slices. However, most oceanic crust for the Jurassic, and almost all oceanic crust for the pre-Jurassic has been consumed by subduction. In the absence of isochron data, and with no information about spreading rates for these palaeo-ridge systems, this approach has taken the average hypsometry from the Recent and imposed this on the ridge bathymetry for these time slices. A similar approach has been taken for the dissection of MORs by oceanic fracture zones. Where known (such as the Atlantic), these are defined directly from the palaeoenvironmental maps. Where this is not the case (most of the Jurassic, and all of the pre-Jurassic ridge systems), the approach has arbitrarily dissected the ridges to reflect a scenario between the modern examples of the intensely dissected Mid-Atlantic Ridge, and the more continuous profile of the East Pacific Ridge. For the purposes of PES modelling, the mapped MORs influence the partitioning of deep ocean waters.

Behind each ocean-ocean trench, the approach has included a bathymetric ridge and islands representing the chain of volcanoes that today typify island-arc systems, such as the Marianas. Mapped volcanic islands and the associated ridges are diagrammatic. Such long linear bathymetric highs do have an effect on oceanic circulation and on the results of global tidal models. The exact position of these islands is conjectural but reflects the typical distribution of bathymetries in modern analogues (e.g., southwestern Pacific).

Palaeo-Earth Systems Modelling

Any palaeo-Earth systems model may be used as an input to the predictive model that this approach is using. In this embodiment, the palaeo-Earth systems model is the UK Met Office model HadCM3, which is a sophisticated coupled atmosphere/ocean GCM. As such, this model is based on the computation of the physical processes that operate in the atmosphere and oceans. It provides a very broad spectrum of information for areas where observational and/or proxy data are sparse or impossible to obtain. Although limited by grid cell size, the resulting models of this software provide a way of deriving consistent, digital palaeoenvironmental parameters globally. If properly tested (see later discussion), such computer models provide tremendous predictive power for exploration. This approach investigates and predicts the palaeoenvironmental conditions for marine source facies accumulation; as such, the provision of climatic, oceanographic parameters is used.

HadCM3 is a state-of-the-art computer model, operated in academia and by governments for daily and longer-term weather forecasting and palaeoclimate modelling. As such, the model used is frequently updated and validated.

Palaeo-Earth systems models provide the climatic and oceanographic parameters for the majority of the processes that control OM productivity, preservation and dilution, including the rate and grade of sediment flux. The source facies predictive method includes values for particulate organic carbon (POC) production through nutrient supply to the photic zone by oceanic upwelling and, storms, preservation of POC-rich sediment at various water depths and dilution of POC-rich sediment by, for example, carbonate production. Each of these has an Earth systems component.

The HadCM3 Palaeo-Earth Systems (Climate) Model

Figure 5:
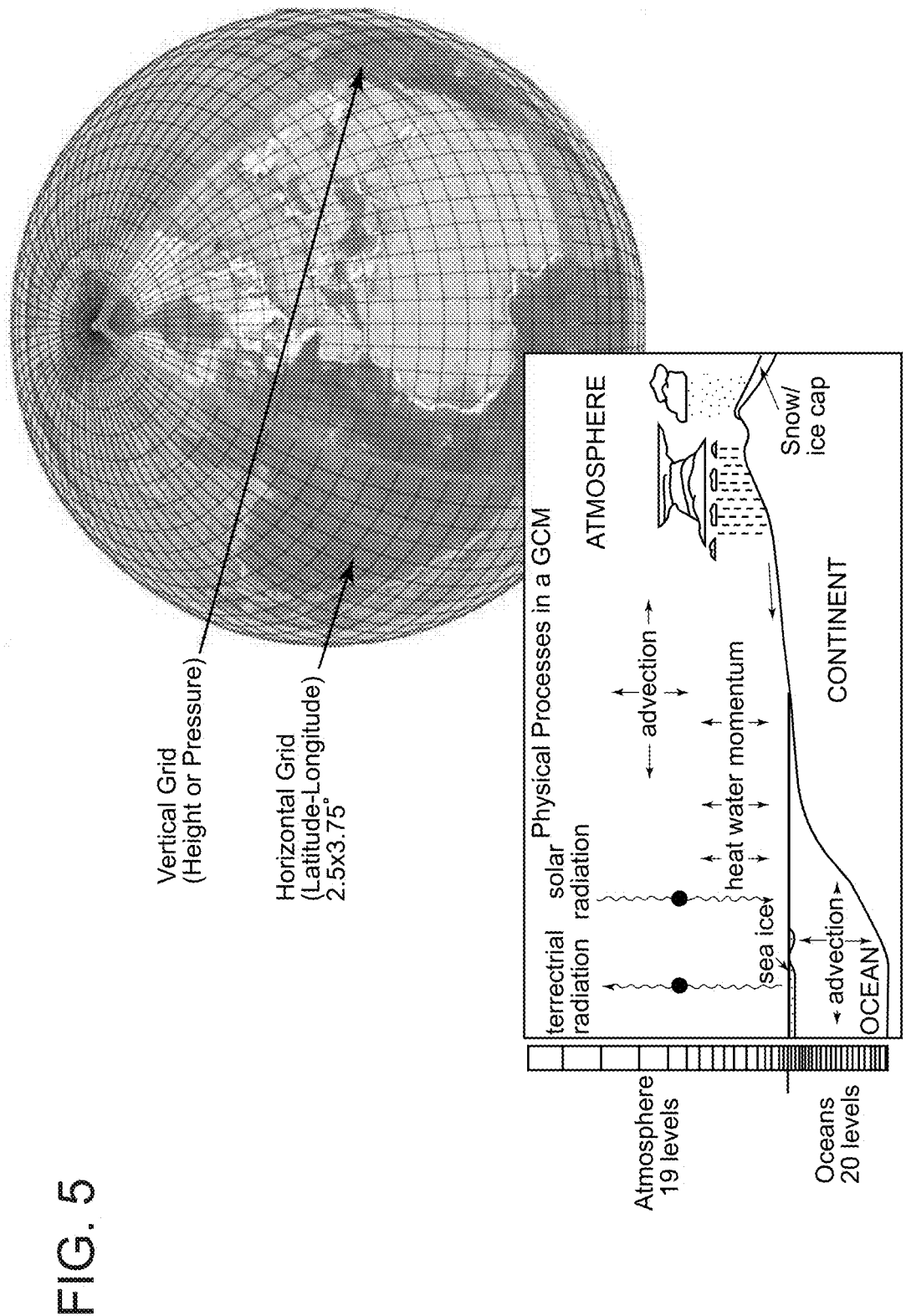
FIG. 5 illustrates a climate model structure.

The UK Met. Office Hadley Centre, HadCM3 model, is a coupled atmosphere-ocean grid-point general circulation model (GCM). It has 19 atmospheric levels and 20 ocean levels with horizontal resolution of 2.5° latitude by 3.75° longitude, as illustrated in FIG. 5. The entire atmosphere and ocean are modelled and the dimensions of the grid cells are a diagrammatic illustration not to scale. Other models may be used for this purpose. This software may advantageously be used to model palaeoclimate. The performance of the model when measured against the recent is valuable in understanding uncertainty in application to climate in the deep past.

One advantage of HadCM3 over older GCMs is that there is no flux adjustment. Many climate models include computational corrections for discrepancies in the amount of heat (energy) transported from equator to poles. These discrepancies cause the model results to drift in successive model runs (climate drift). Since this can only be recognized with respect to observed conditions in the modern era, such corrections (known as flux adjustment), implicitly carry with them a modern day solution that cannot be appropriate for the range of hot-house and ice-house climate conditions that were represented over the geological time. HadCM3 removes this uncertainty.

The boundary conditions for HadCM3 models include:

Palaeotopography and palaeobathymetry (map examples summarized in FIG. 4.

Terrestrial drainage basins, so that outfalls of fresh water and fluvio-deltaic sediment are contributed to the ocean at locations that are explicitly defined by the palaeotopographic mapping.

Terrestrial vegetation cover. As the model is run, the terrestrial vegetation component of the model (TRIF-FID) provides feedbacks that modify precipitation, temperature, etc. so that the modelled vegetation cover develops in equilibrium with the modelled climate. Because the Earth's flora has evolved over geological time, the vegetation cover (known as plant functional types or PFT) for each time slice was modified to coincide with main phases of floral evolution. For the Early Silurian, all vascular plant types were removed. Needle leaf trees and shrubs were retained for the Late Devonian. Broad leaf trees were retained for the Late Cretaceous and the full modern set of PFTs was retained for post Mid Oligocene models. For each post Silurian model, the vegetation cover was set initially as shrub vegetation everywhere so that the equilibrium vegetation cover (PFTs) could develop from that, in the model.

Soils. The soil scheme is set by default as a medium loam, a soil type that is typical of much of modern Western Europe and central and eastern North America.

Atmospheric chemistry. The models included here were run with conservative estimates of atmospheric $CO_2$ derived from the GeoCARB III curve (known in the literature) as a guide. These values include the modelling work of Berner et al. (1983) and Berner (1991, 1994), and the geochemical calculations of Cerling (1991) using soil carbonates, and Freeman and Hayes (1992) using the carbon isotope signature of POM. More recent work by Pearson and Palmer (2000), using boron isotope analyses, indicates that even higher $PCO_2$ values may be appropriate for the Late Mesozoic. Atmospheric $CO_2$ values were set depending on the time slice.

The solar constant. This has increased in accordance with the long term spin-down of the Sun, so that, over geological time, it is not a 'constant' and has, therefore, been set using an evolutionary model for each time slice, for example:

99.73% of the Present Day solar constant for the Rupelian, 99.24% of the Present Day solar constant for the Turonian, and 97.5% of the Present Day solar constant for Asselian and Frasnian.

Year length, i.e., a single revolution of the Earth around the Sun has decreased through geological time and was therefore set, for examples, as follows:

365 days for the Cenozoic, 370 days for the Cretaceous, 383 days for the Permian, and 399 days for the Devonian.

Palaeo-Earth Systems (Climate—Ocean) Model Results

The HadCM3 model coupled ocean-atmosphere experiments require quite long spin-up times in order to get the large volume of water in the oceans to an equilibrium state. In early work, the spin-up was accomplished by a set of short iterations between atmosphere-only models, and long runs of ocean-only models. However, increased computer speed allows to complete a more direct approach. The fully coupled model is either initialized from rest or from a simulation from a similar palaeogeographic configuration. The model is then integrated for approximately 500 years, at which point the trends in ocean conditions are used to extrapolate for an additional 1000 years (using a principle component decomposition and using a non-linear exponential fitting procedure). This is typically repeated a further two times allowing to effectively accelerate the spin-up by a factor of 3 (1500 model years become 4500 years). Finally, the model is run for a minimum of a further 2000 years with no interventions. The resulting trends in the deep oceans are negligible, with the volume integrated mean ocean temperature changing typically trending by less than 0.2° C. per millennia and surface temperature trends being an order of magnitude smaller.

HadCM3 produces a vast array of atmospheric and oceanic model results, including: monthly means, annual results (mean, range, minimum and maximum), and seasonal results. Two grid resolutions are used: raw data with grids at 2.5°×3.75° as produced by the model from which grids at 0.25°×0.25° are derived from a simple spline of the raw data. Although interpolation using a spline technique could be viewed as problematic, this is used so that model results can be used in palaeoenvironmental prediction for most shelf epeiric seas and narrow seaways where the majority of potential marine source rocks were deposited.

A Time Series of Climate

Figure 6:
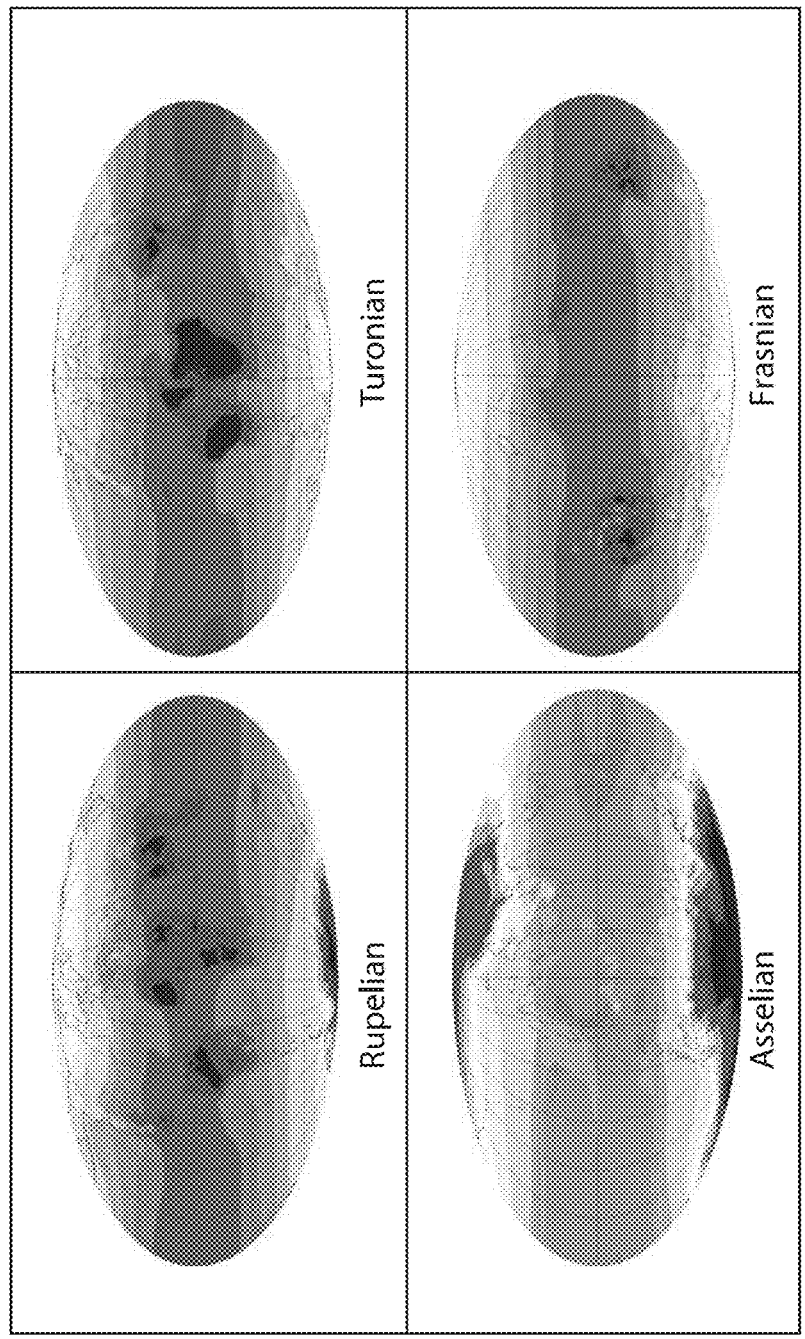
FIG. 6 illustrates palaeo-earth systems, surface air temperature model results for different times in Earth history.
Figure 7:
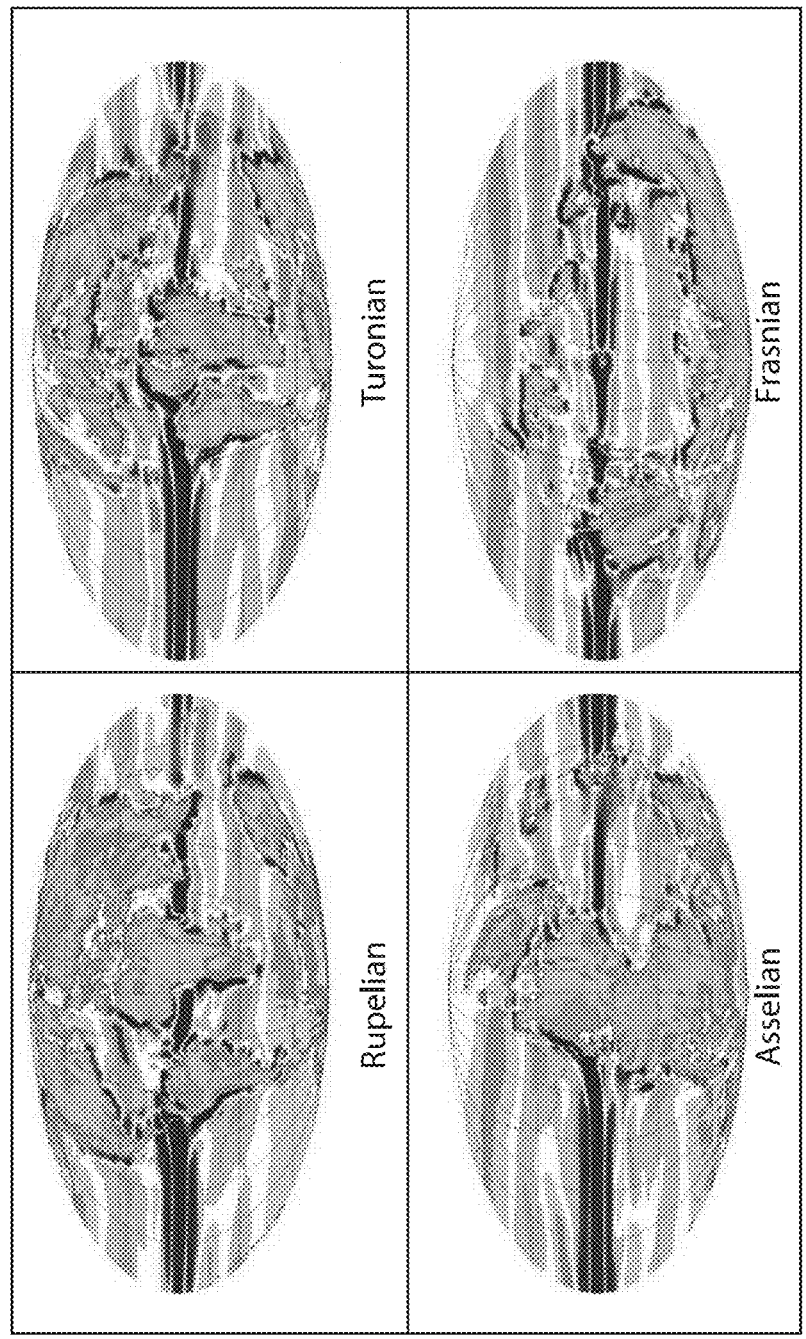
FIG. 7 illustrates the latitudinal stability of wind driven processes and upwelling model results for different times in Earth history.
Figure 8:
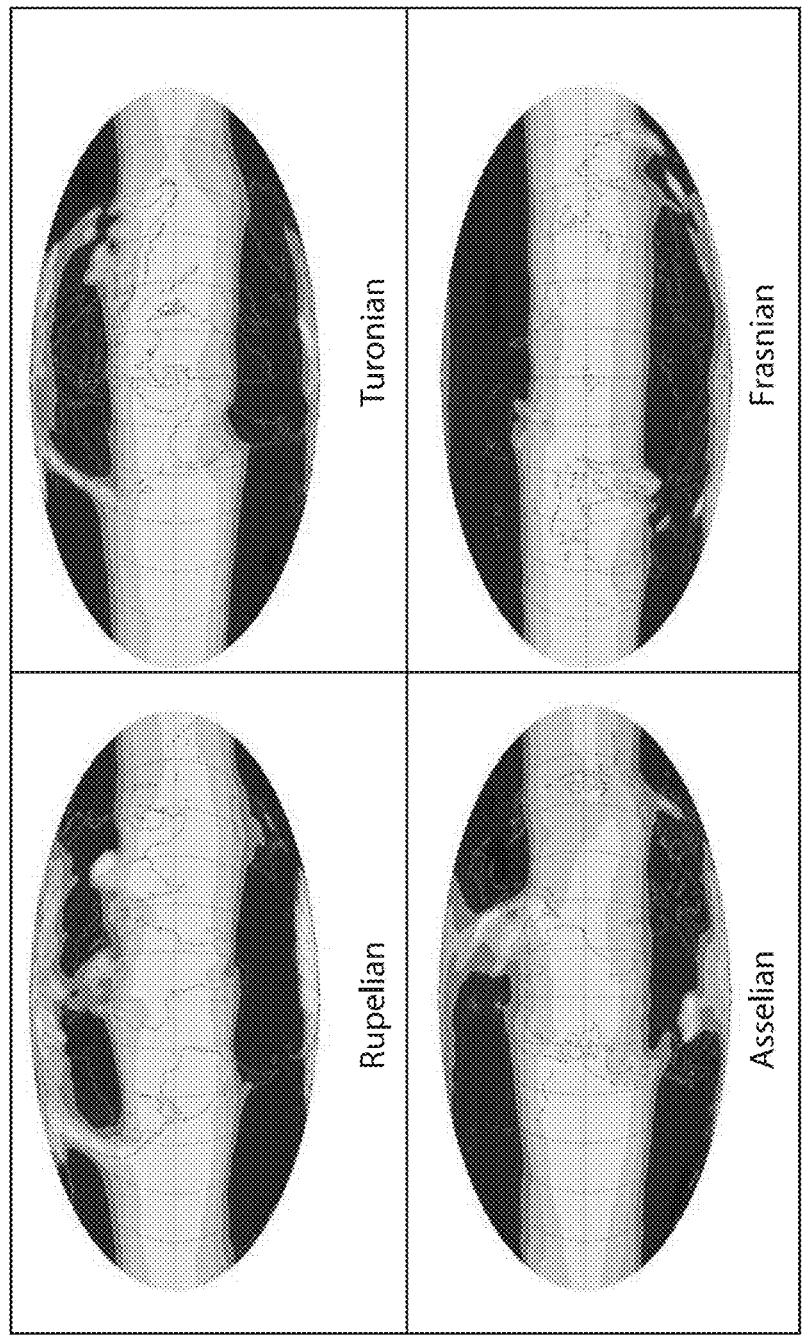
FIG. 8 illustrates the latitudinal stability of climatic processes responsible for storminess based on an eddy kinetic energy model results for different times in Earth history.
Figure 9:
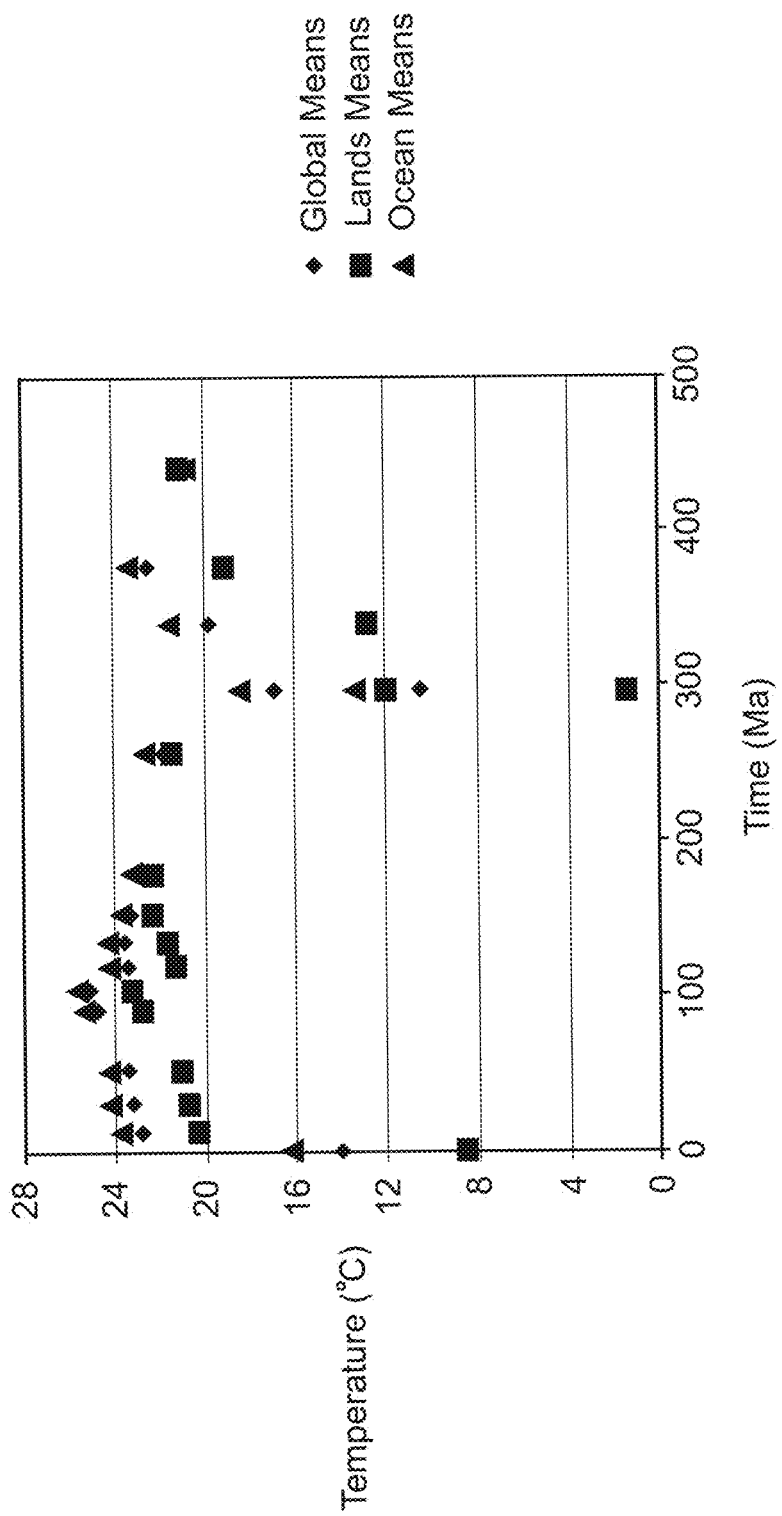
FIG. 9 illustrates a time series of Earth climate.

Model results from HadCM3 (PESM) are illustrated in FIGS. 6-8 and can be viewed as a time series of climate (see FIG. 9). FIG. 6 shows the surface air temperatures, FIG. 7 shows the resulting upwelling model having the latitudinal stability of wind driven processes, and FIG. 8 shows Eddy kinetic energy results. Global climatic variation over the ca. 400 My time span included here commences with the Late Palaeozoic hot house climate modelled for the Late Devonian (Frasnian); it also includes the Permo-Carboniferous ice house modelled for the Early Permian (Asselian), Mesozoic hot-house climates and the climatic deterioration in the Neogene to the Present Day ice-house condition. The Mesozoic hot-house climates as modelled here, peaked in the Late Cretaceous. The Asselian ice-house condition shown in FIG. 9 includes two sets of results: one from the principal model that was run with Present Day atmospheric gases to represent an interglacial climate and a second sensitivity test model that was run with trace greenhouse gases and a cool southern hemisphere orbit to simulate near glacial maximum conditions.

Model Testing/Confirmation

Comparison with Modern Observations

The HadCM3 software was used for both weather forecasting and climate modelling. Weather predictions are tested on a daily basis by reference to data from weather stations and the performance of the model has been improved using that process. With regard to climate, the Hadley Centre/UK Met Office express a high level of confidence in its replication of the modern system. This approach has largely relied on this testing as reported in a series of climate model inter-comparison projects. The sensitivity of the model to initial conditions is one of the tests that the Hadley Centre/UK Met Office performs and robust results have been produced.

Comparison with Ancient Climate Proxy Data

Data points from wells, boreholes and outcrops were gathered during the process of construction of the GDE maps, which serve to underpin the mapping by providing hard data on lithology and interpreted palaeoenvironment. In addition, point data on a standard group of "qualifiers" were also gathered to include additional detail on lithology, fauna and flora, including those which are palaeoclimate proxies. The main climate proxy point data compiled were:
  Coals;
  Evaporites (gypsum/anhydrite and halite);
  Carbonate buildups representing "reef", "oolith", "coralgal" assemblages and "rudist" assemblages;
  Cherts;
  Phosphates; and
  Other proxies including tillites, flora and fauna, red beds, aeolian dune sands and palaeosols.

The climate proxy data does not contribute to the functioning of the HadCM3 model, but were employed to test and validate the results of the climate model for each time slice. A general quality categorization was employed, using a scoring system based on the uncertainty of the point location and the stratigraphic precision with which it represents the particular time slice. Scores for each criterion range from 1 to 3, with the resultant sum therefore ranging from 2 to 6. To provide an illustration of the methodology, examples are included here based on the following criteria:
  Carbonate build-ups: Although salinity controls are also important, the temperature control is emphasized here, with carbonate development limited to surface waters where the minimum temperature is 15° C.; and
  Evaporites: Number of months of negative P–E (precipitation minus evaporation) and where necessary with the number of months of wet season, where precipitation is >40 mm/month and also the maximum values of salinity achieved in surface waters. No defined cut-off exists, but an arbitrary lower limit of 4 months negative P–E was used to assess the data.

Small and variable sample size and the way some of the data is clustered at studied outcrop localities means that a rigorous statistical analysis was not undertaken. Instead, a simple calculation was made of the percentage of climate proxy data points coinciding with the expected climate zone. This comparison of the results of the model output splined to 0.25° with climate proxy data points does produce encouraging results with high levels of correspondence between data points and expected climatic parameters. Overall, the success rate for peats/coals was 86.6%, evaporites 93.7%, carbonate build-ups 83.1% and cherts and phosphates 80.8%.

Source Facies Prediction Methodology: Modelling the Productivity and Preservation of Organic Matter in Deep Time The methodology employed in source facies prediction using the Merlin+ software is now explained. Prediction of the original distribution of OM productivity and preservation to produce source facies is facilitated by this method, and areas where these source facies have not been destroyed by erosion or subduction can also be defined. However, the method does not enable prediction of thermal maturity, so that shallow-burial will mean that in some areas the predicted source facies could well be immature and, conversely, where deeply buried, the predicted source facies may be mature or over-mature.

This method utilizes the outputs from the global scale Earth systems modelling of palaeoclimate, palaeoceanography and palaeotides. It is therefore a tool for evaluating frontier basins on a global scale, or for identifying new exploration plays in major established basins. In frontier basins, this may allow an oil company to enter new opportunities at minimal cost. In established basins, hydrocarbon accumulations are not always linked reliably to their source kitchens, and new insights from the predicted potential source facies may lead to profitable new opportunities close to existing infrastructure. All these advantages may be determined based on the image generated by the method.

An Overview of the 'Automated' Predictive Model

The predictive methodology summarized here models organic carbon fluxes. The automated part of the model utilizes standard ESRI spatial analysis tools and allows key parameters to be adjusted to best fit control data.

Figure 10:
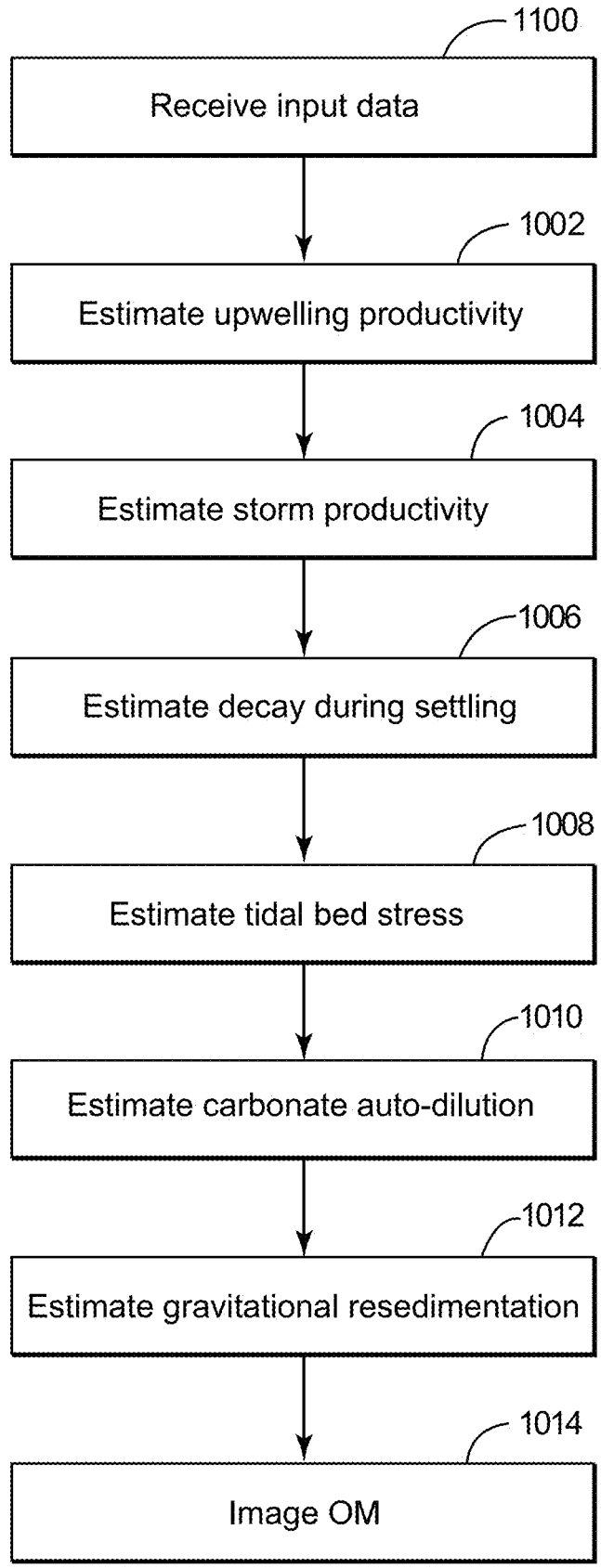
FIG. 10 is a flowchart of a method for estimating the spatial distribution of source rocks.

The method, as illustrated in FIG. 10, starts in step 1000 by receiving input data. The input data includes paleogeography data, which includes one or more of palaeotopography, palaeobathymetry, and palaeo-Earth systems model results.

The method estimates in step 1002 the upwelling productivity. Upwelling is a potent process in the supply of nutrients to the photic zone and also includes the effects of seasonal variations in the available solar radiation. This step uses an original time and space quantification of the months with upwelling. In step 1004, the method estimates the storm productivity. This step is novel as it was not used in the early analogistic work on source prediction. Step 1004 also includes the seasonal variation in solar radiation and the persistence of available nutrients from storm stirring beyond the winter months (of low available solar radiation).

Step 1006 estimates the decay of OM during settling. This step is built around the Martin equation (Martin et al., 1987) for organic carbon lost to decay during settling through the water column. In step 1008, the tidal bed stress is estimated. The addition of this step to calculating a predictive model is innovative as no published work has recognized it. In one application, the chemical environment of preservation vs. oxidation is used in this step. This feature is discussed later in more detail. The improved method for generating high resolution oceanic DEMs has meant that the application of the ICOM tides model is more effective.

In step 1010, the carbonate auto-dilution of OM is estimated. This step reflects benthonic carbonate production in shallow marine, environments areas by introducing both 25 m and 50 m water depth cut-offs. In step 1012, the gravitational resedimentation into deep water is estimated. This represents an innovative combination of bathymetric mapping and OM flux prediction.

Figure 11:
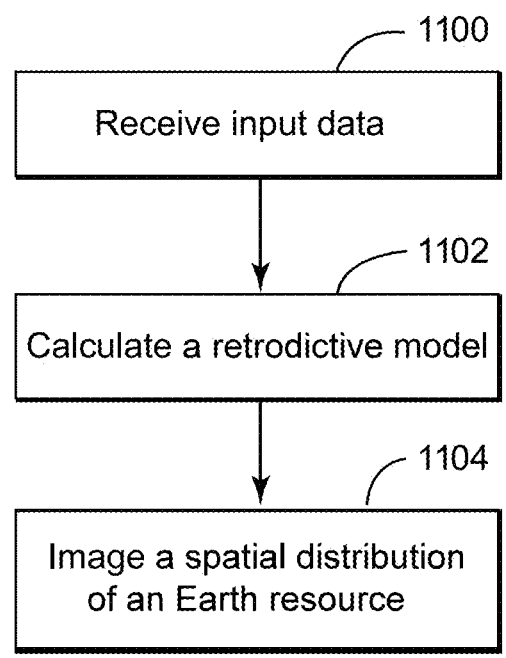
FIG. 11 is another flowchart of a method for estimating the spatial distribution of source rocks.

The predictive (retrodictive) model built in the previous steps is then used in step 1014 to generate an image of the spatial distribution of source rocks (or another characteristic of Earth resources). The method discussed above may be summarized as illustrated in FIG. 11, to include a step 1100 of receiving palaeodata, a step 1102 of determining a predictive (retrodictive) model based on the palaeodata, and a step 1104 of imaging a spatial distribution of preserved potential source rock (or other characteristic) for a part of the Earth. A part of the Earth may include a basin or reservoir, one or more tectonic plates and/or their intersections and the entire Earth. Those skilled in the art would understand that the palaeodata includes at least one of paleogeography data comprising palaeotopography, palaeobathymetry, and Palaeo-Earth systems model results, as discussed in the previous sections. Those skilled in the art would also understand that instead of calculating the spatial distribution of source rocks, it is possible to calculate other characteristics of the Earth, as for example, modelling/quantification of particulate organic carbon sequestration in marine sediments (as part of the carbon cycle), global sediment flux calculation, diamond placer deposit predictions, or other minerals deposit predictions. The step 1102 of determining the predictive (retrodictive) model may include one or more of steps 1002 to 1012 discussed above. Although the combination of steps 1002 to 1012 in FIG. 10 is believed to be novel and not obvious, the inventors note that derivations of the flowchart shown in FIG. 11 may be easily designed based on the present description. In other words, one skilled in the art would understand that step 1102 may include only one, two, three, four, or five of the steps 1002 to 1012, in any order and/or combination. This means that in one application, step 1102 includes, for example, only step 1002, or only steps 1002 and 1004, or only steps 1002, 1004, and 1006, or only steps 1004 and 1006 or any other combination of the steps 1002 to 1012. This is possible because each of the steps 1002 to 1012 accounts for one aspect of the source rock, and while all these steps would produce the best image for the spatial distribution of the source rocks, by omitting some of the steps 1002 to 1012 it is still possible to produce a partial image of the spatial distribution of the source rocks.

The flux and discounting values applied in each of steps 1002 to 1012 of these methods are now discussed.

Step 1002: Upwelling Productivity

The upwelling productivity is derived from the ocean circulation current GCM results, where the number of months per year with vertical (positive) upwelling is extracted and converted to carbon flux values by analogy with modern data.

Nutrient supply, water turbidity and the related depth of light penetration are some of the factors that control primary productivity in the marine photosynthetic biosphere. Upwelling is one of the factors in the supply of nutrients to the photic zone and low light levels are a seasonal limit on primary productivity, particularly at high latitudes in polar winters. The amount of light received at the Earth's surface is a significant seasonal factor limiting primary productivity. Therefore, to account for the seasonal variations in day length and the associated variation in available solar radiation, a simplified approach was adopted whereby the monthly net solar radiation values were normalized against the monthly maximum net solar radiation value to provide decimal solar factors, which are then applied to the monthly productivity value in each grid cell. This is a gross simplification of the processes that are known; photosynthesis-irradiance curves have been used extensively to probe the efficiency and capacity of photosynthesis with respect to light intensity. At the lowest irradiances, photosynthetic rates are linearly proportional to irradiance, but, as irradiance increases, saturation is reached whereby photosynthetic rates slow and eventually may decline. Different species of marine phytoplankton respond in different ways to irradiance, and so, to determine an appropriate saturation irradiance that could be applied in the model is challenging. Species diversity and their response to irradiance are difficult if not impossible to determine for the deep past and as such, a simplified approach has been adopted. This represents an important advance comparative to the method used in Merlin+ Phase 1, where variations in available light at the surface were not used at all.

Step 1004: Storm Productivity

The storm productivity estimation is derived from the storminess (eddy kinetic energy, (EKE)) elements of the GCM results, which are converted to carbon flux values by analogy with modern data. Modifications to account for seasonal variations in day length and the associated variation in available solar radiation have been made in the same way as for step 1002. The monthly net solar radiation values were normalized against the monthly maximum net solar radiation value to provide decimal solar factors, which were then applied to the monthly productivity value in each grid cell.

Storm stirring is an effective process that contributes to the supply of nutrients to the photic zone, and, during the winter, when there is little available solar radiation and therefore, little productivity from phytoplankton, these nutrients will remain in the water column. This is relevant for storm-related productivity because storms are more frequent and most energetic during the winter. To account for the persistence of available nutrients from storm stirring, beyond the months of low available solar radiation, storm productivity values from the preceding two months have been incorporated into the productivity estimated for each month.

Step 1006: Decay During Settling

Estimating the decay during settling through the water column was derived from the palaeobathymetric DEM using the Martin equation (Martin et al., 1987). The Martin equation is derived from sediment trap data collected in low to mid latitude, open ocean, coastal and upwelling sites in the Pacific. In areas of unusually high productivity and in restricted basins that are poorly ventilated, oxygen minimum zones and stratified anoxic water bodies develop. Consequently, the proportion of organic carbon lost to decay during settling is reduced in these areas. The focus of the Merlin marine source facies prediction work is to predict areas of high export productivity and areas of OM accumulation and preservation at the seabed. A method to accommodate the development of dysoxia/anoxia has been devised for use with the steps illustrated in FIG. 10 and this method is discussed later.

Step 1008: Tidal Bed Stress Depositional Thresholds

Tidal bed stress values from the ICOM palaeotidal modelling were used to limit the shelfal areas on which marine organic matter could accumulate. High to moderate tidal bed stresses prevent marine particulate organic matter accumulation at the sea bed because these stresses develop with each tide and so operate once or twice every day, before organic matter in sea bed sediments has the opportunity to develop cohesive attachment and therefore resistance to erosion. The bed stress values used were initially based, by analogy, on the distribution of organic-rich mud on modern shelves in relation to modelled tidal bed stress.

Step 1010: Carbonate Auto-Dilution

In shallow shelfal areas where water temperatures are moderate to high, and sea-water salinities are about average, a substantial proportion of primary production is either fixed by benthonic calcareous algae, or is utilized by filter feeders in coral and mollusk dominated platformal and reefal carbonate complexes. These are benthonic carbonates that accumulate in shallow marine environments. To reflect that this step has been modified from the approach used in Merlin+ Phase 1 to include a 25 m and 50 m water depth cut-off, carbon flux values have been discounted in shelf areas shallower than 25 m and 50 m with appropriate modelled water temperatures and water salinities. However, the discounting values are not well-constrained since there is a paucity of appropriate data for present day shallow marine environments.

In shallow marine shelf areas where the minimum sea surface temperature is 15° C., discounting values were applied in two depth ranges: 0 m to 25 m and 25 m to 50 m.

Step 1012: Gravitational Re-Sedimentation

Gravitational re-sedimentation into deep water is modelled using the ArcGIS flow accumulation tool. The palaeo-DEM is used to define the re-sedimentation area, which is located downslope from the shelf break. The initial starting values are weighted by the carbon flux value predicted in shelfal waters by step 1010 (i.e., after application of carbonate discounting).

These re-sedimentation values are cumulative, and thus represent maximum downslope fluxes. They should therefore simply be used to high-grade areas prone to receive organic-rich mud gravity slides and low density turbidity current flows. The values should not be used unmodified in basin modelling.

Dysoxia/Anoxia and Organic Matter Preservation

The above discussed methods can be implemented without knowing the oxygen characteristics of the ocean. However, if these characteristics are added to the predictive model, for example, in step 1008, the image of the spatial distribution of the source rock is improved. Such improvement is now discussed.

Oceanic oxygen concentration, circulation and exchange with the atmosphere is not captured as a parameter in the current climate models, but it is an important control on OM preservation and features prominently in the source facies literature. The addition of a dysoxia/anoxia element to the Merlin+ predictive routine is therefore a desirable goal. The variables that influence the concentration of oxygen at any given location in the ocean include the following:

Temperature,
Salinity,
Mixed layer depth,
Water depth,
The rate of air-sea gas exchange,
Lateral and vertical flow,
Rates of photosynthesis, and
Aerobic degradation of organic matter.

In the surface mixed layer, sea water is saturated to super-saturated with respect to $O_2$. The air-sea gas exchange and the trapping of bubbles ensures constant dissolution of atmospheric $O_2$. Supersaturation in the mixed layer is greatest in spring and summer, when phytoplankton activity and associated OM productivity is greatest. Warming of the surface layers of the sea in summer also creates a shallow density gradient that inhibits vertical mixing. $O_2$ concentrations decrease below the surface mixed layer because here there is no direct access to atmospheric $O_2$ and biological consumption of $O_2$ therefore exceeds resupply.

To effectively model in detail the complex processes that govern the concentration of oxygen in all layers of the ocean, it requires complete integration of required parameters into the global climate model for the selected time slice. This is beyond the scope of the existing models, e.g., HadCM3 and the Merlin+ methodology. However, to address this aspect of source facies prediction, a simplified approach that includes a few controlling processes is possible.

The aim of this embodiment is to identify areas prone to anoxia/dysoxia in ancient epeiric seas and to differentiate restricted basins where a positive water balance could result in water column stratification facilitating the development of anoxic bottom waters. This model has been suggested by numerous authors. However, currently, the proportion of the continents that is flooded by the sea is at a Phanerozoic low, thereby creating few modern analogues that can be studied in attempts to validate or further understand the water column stratification models that have been proposed as a key aspect of many Mesozoic source rock environments. Modern epicontinental seas such as Hudson Bay and Gulf of Carpentaria exhibit oxic-suboxic bottom waters. The only example of a modern epicontinental sea subject to widespread anoxia is the Baltic, where oxygen depletion is largely a result of hydrographic restriction and strong estuarine circulation. For this reason, the development of the approach used here is conceptual and largely model driven.

Anoxia Prediction

The background and methodology implemented to generate dysoxia/anoxia grids is now discussed.

Palaeo-Solubility of Oxygen ($O_2$) at Sea Surface

Solubility is a measurement of how much of a substance will dissolve in a given volume of a liquid (e.g., $O_2$ in sea water). Saturation is reached when no more $O_2$ can dissolve and the saturation concentration is achieved. The saturation concentration of oxygen in the oceans is dependent on the concentration of oxygen in the atmosphere. Photosynthesis in the surface layers of the oceans may locally increase $O_2$ production, resulting in super-saturation and degassing into the atmosphere. Conversely, aerobic respiration decreases the concentration of $O_2$ below the sea surface. Air saturated water has a dissolved oxygen concentration that is dependent on temperature and salinity and therefore exhibits a latitudinal gradient that reflects these parameters. For the purposes of Merlin+, the equation defined by Garcia and Gordon (1992), which incorporates the GCM derived annual sea surface salinity and temperature grids to provide an oxygen solubility in μmol/kg.

Figure 12:
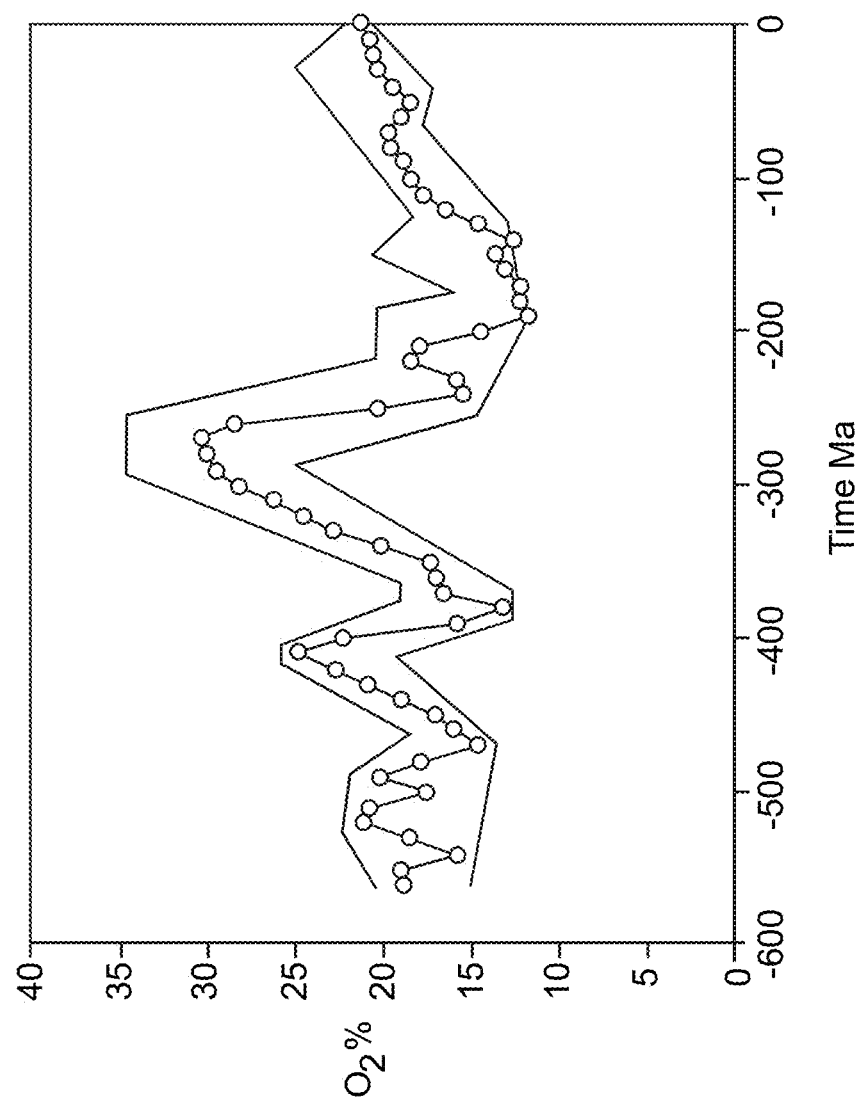
FIG. 12 illustrates the oxygen concentration over time in the atmosphere.

On time scales of hundreds to thousands of years, the concentration of oxygen in the atmosphere is controlled by global rates of photosynthesis and respiration. On longer time scales, the dominant control on the concentration of oxygen in the atmosphere is the burial of organic matter and pyrite in sediments and the oxidative weathering of these materials on the continents (plus oxidation of reduced C and S containing gases liberated from them at depth). Berner (2006) has modelled the concentration of $O_2$ in the atmosphere on geological time scales by using reasonable estimates of burial rates and weathering rates of organic matter and pyrite, as illustrated in FIG. 12.

To account for the variability in atmospheric oxygen through time, this method has multiplied the initial solubility of oxygen grids by a time slice specific oxygen ratio, as illustrated in Table 1:

| Time slice | p $O_2^{atm}$ | p $O_{2\ time\ slice}$/p $O_{2\ recent}$ |
|---|---|---|
| Recent | 0.209 | 1.000 |
| Serravallian | 0.190 | 0.909 |
| Rupelian | 0.190 | 0.909 |
| Ypresian | 0.180 | 0.861 |
| Maastrichtian | 0.185 | 0.885 |
| Turonian | 0.190 | 0.909 |
| Albian | 0.170 | 0.813 |
| Aptian | 0.140 | 0.670 |
| Valanginian | 0.120 | 0.574 |
| Tithonian | 0.130 | 0.622 |
| Kimmeridgian | 0.130 | 0.622 |
| Bathonian | 0.125 | 0.598 |
| Toarcian | 0.120 | 0.574 |
| Wuchiapingian | 0.190 | 0.909 |
| Norian | 0.180 | 0.861 |
| Asselian | 0.310 | 1.483 |
| Visean | 0.190 | 0.909 |

-continued

| Time slice | p O$_2^{atm}$ | p O$_2$ $_{time\ slice}$/p O$_2$ $_{recent}$ |
|---|---|---|
| Frasnian | 0.120 | 0.574 |
| Aeronian | 0.180 | 0.861 |

The concentration of O$_2$ in the atmosphere is derived using values as summarized in FIG. 12. The concentration of O$_2$ in the recent atmosphere is taken as 20.9%. By multiplying the time slice specific solubility of oxygen at the sea surface grid by the time slice specific oxygen ratio, a palaeo-solubility of oxygen grid is generated. Table 1 shows time slice specific concentration of atmospheric O$_2$ and the resultant time slice specific oxygen ratios % O$_2$ time slice/% O$_2$ recent.

Application of the time slice specific palaeo-solubility of oxygen grid to the Merlin+ time slices has implications in the sense that the contrast between the OM preservation environments represented in the warm seas of the hot-house phases of Earth history and the ice-house phases are very different.

Mixed Layer Ventilation at the Sea Bed

The mixed layer of the oceans is the near surface region in which oceanic tracers including oxygen, temperature, salinity and density are near uniform, as a result of wind driven surface mixing and the action of waves. The depth and temperature of the mixed layer varies with seasonal surface heat fluxes, which alter the density of surface waters, and the storminess of the climate system. In summer, the mixed layer depth is shallowest because of weak winds and surface warming whereas in winter, storms are more frequent and high winds deepen the mixed layer. Monthly, seasonal and annual mixed layer depths are included in the MDA for each time slice under 'Model Results: Ocean'.

The mixed layer ventilation at the sea bed grids are generated by intersecting the annual maximum mixed layer depth with the bathymetry. At the points where the maximum mixed layer depth is at the sea floor, a marker is provided to indicate areas with minimal potential for long term/year round anoxia, because, for at least part of the year, the water column is well mixed and ventilated to the sea bed.

Depth Related Salinity Variation

A grid with this parameter provides a count of the number of months where the ocean bottom salinity minus the sea surface salinity>=3.5 0/00, thereby providing an indication as to whether there is potential for salinity stratification to develop and whether the stratification is either year round or seasonal.

Water depth and vertical exchanges of organic matter and oxygen across the halocline are also parameters to be considered in determining the potential for anoxia to develop. The smaller the volume of water beneath the mixed layer, and the lower the vertical exchanges of oxygen, the less oxygen is available to remineralize organic matter before it reaches the sea bed. These parameters have not been incorporated into the current approach.

Anoxia Potential

Biological consumption of O$_2$ by aerobic respiration is a key control on the concentration of oxygen in the water column beneath the mixed layer. Areas of high export productivity generate a high oxygen demand which may not be met if ventilation is sluggish. In these circumstances, dysoxic/anoxic conditions will develop. To identify areas prone to anoxia for the Merlin+ time slices, four key grids can be utilized:

Organic carbon export productivity (Step 1002 prediction in FIG. 10=upwelling productivity+storm induced productivity),
Palaeosolubility of oxygen (O$_2$) at sea surface,
Mixed layer ventilation at the sea bed, and
Depth Related Salinity Variation (months: salinity difference>=3.5 0/00).

Grids 1-3 were selected because they have global applicability and were used in the 2015 Predictions. The Depth Related Salinity Variation (months: salinity difference>=3.5 0/00) grid was used to identify any high-grade basins that display the potential to develop either seasonal or prolonged stratification, thus inhibiting ventilation beneath the mixed layer and creating the environmental conditions favorable for anoxia to develop. Early spring warming and late autumnal cooling can prolong episodes of anoxia and therefore, the longer the duration of stratification, the better the potential for anoxia to develop.

The risking process for Merlin+ is a four-step approach (as illustrated in FIG. 13) in which:
1. Classification of Merlin+ organic carbon export productivity (step 1002 export productivity) into low (0-50 gC/m2/year), moderate (50-90 gC/m2/year) and high (>90 gC/m2/year). The thresholds were defined from observations of recent satellite derived estimates of export productivity. For the Recent, 'high' corresponds with areas of intense eastern boundary upwelling such as Peru and southwest Africa, the Inter-Tropical Convergence Zone, and areas of high storm induced productivity; 'low' generally corresponds with the subtropical gyres.
2. Classification of the palaeo-solubility of oxygen at the sea surface into low (<200 µmol/kg), moderate (200-300 µmol/kg) and high (>300 µmol/kg). For the Recent, the solubility of oxygen at the sea surface falls in the range 192-460 µmol/kg.
3. Application of the mixed layer ventilation at the sea bed grid to high-grade regions that are not ventilated to the seabed at any point throughout the year.
4. High-grading of basins where salinity stratification may contribute to the development of anoxia using the Depth Related Salinity Variation grid (months: salinity difference>=3.50/00" grid).
    a. 0-3 months where the salinity difference>=3.5 0/00, 0 added to the anoxia potential score;
    b. 4-8 months salinity difference>=3.5 0/00, 1 added to the anoxia potential score; and
    c. 9-12 months salinity difference>=3.5 0/00, 2 added to the anoxia potential score.

FIG. 13 illustrates how the risking process is applied. The resulting "Anoxia Potential" grid has values from 1 to 10, indicating very low potential (1) to very high potential (10) for anoxia to develop. The grid has been cropped at −2,000 m. In the modern oceans, the extent of the oxygen minimum zones (OMZs) rarely extends beyond 1,500 m (Helly and Levin, 2004), but, without a fully integrated ocean carbon cycle model, it is not possible to determine the depth to which an OMZ exists for each time slice.

Figure 14:
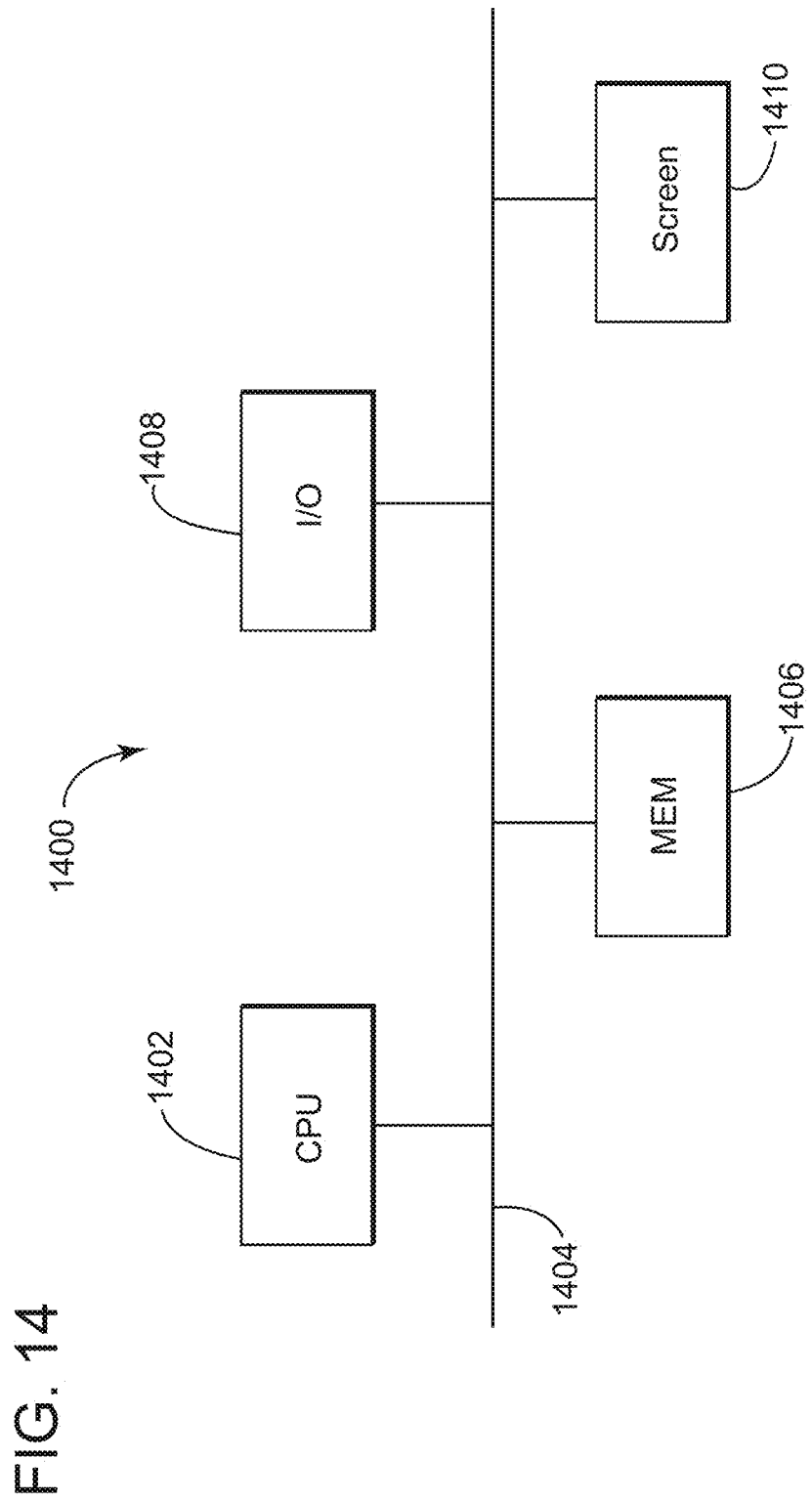
FIG. 14 is a schematic diagram of a computing device that performs one or more of the methods noted above.

A computing device that may implement one or more of the methods discussed above is now discussed with regard to FIG. 14. Computing device 1400 includes a processor 1402 that is connected through a bus 1404 to a storage device 1406. Computing device 1400 may also include an input/output interface 1408 through which data can be exchanged with the processor and/or storage device. For example, a keyboard, mouse or other device may be connected to the input/output interface 1408 to send commands to the processor and/or to collect data stored in storage device or to provide data necessary to the processor. In one application, the processor estimates steps 1002 to 1012 discussed above with regard to FIG. 10, based on input data discussed in step 1000, which data may be provided through the input/output interface. Also, the processor may be used to run the predictive model to generate the image of the source rocks. Results of this or another algorithm may be visualized on a screen 1410, which may not be part of computing device 1400.

One or more of the embodiments discussed above disclose a method and system for generating a spatial distribution of the source rocks for the entire Earth. It should be understood that this description is not intended to limit the invention. On the contrary, the embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Barron, E. J., 1985, Numerical climate modeling, a frontier in petroleum source rock prediction: Results based on Cretaceous simulations: AAPG Bulletin, v. 69, p. 448-459.

Berner, R. A., 1991, A model for atmospheric CO2 over Phanerozoic time: American Journal of Science, v. 291, p. 339-376.

Berner, R. A., 1994, GEOCARB II: A revised model of atmospheric CO2 over Phanerozoic time: American Journal of Science, v. 294, p. 56-91.

Berner, R. A., A. C. Lasaga, and R. M. Garrels, 1983, The carbonate-silicate geochemical cycle and its effect on atmospheric carbon dioxide over the past 100 million years: American Journal of Science, v. 283, p. 641-683.

Bohacs, K. M., G. J. Grabowski, A. R. Carroll, P. J. Mankiewicz, K. J. Miskell-Gerhardt, J. R. Schwalbach, and M. Wegner, 2005, Production, destruction, and dilution the many paths to source-rock development, in N. B. Harris, ed., The deposition of organic carbon-rich sediments: Models, mechanisms and consequences: SEPM Special Publication 82, p. 61-101.

Bohacs et al., International Patent Application WO2009011737 and U.S. Pat. No. 8,972,233.

Calvert, S. E., and T. F. Pedersen, 1992, Organic carbon accumulation and preservation in marine sediments: How important is anoxia?, in J. K. Whelan and J. W. Farrington, eds., Organic matter: Productivity, accumulation and preservation in Recent and Ancient sediments: Columbia University Press, New York, p. 231-263.

Cerling, T. E., 1991, Carbon dioxide in the atmosphere: Evidence from Cenozoic and Mesozoic paleosols: American Journal of Science, v. 291, p. 377-400.

Christensen, J. H., and F. Boberg, 2012, Temperature dependent climate projection deficiencies in CMIP5 models: Geophysical Research Letters, v. 39, no. 24, December 2012, L24705 p. 1-5

Crowley, T. J., and R. A. Berner, 2001, CO2 and climate change: Science, v. 292, p. 870-872.

CMIP5, 2012, Coupled Model Intercomparison Project Phase 5: World Climate Research Programme, accessed Nov. 7, 2016, http://cmip-pcmdi.llnl.gov/cmip5/index.html.

Demaison, G. J., and G. T. Moore, 1980, Anoxic environments and oil source bed genesis: AAPG Bulletin, v. 64, no. 8, p. 1179-1209.

Dinezio, P. N., and J. E. Tierney, 2013, The effect of sea level on glacial Indo-Pacific climate: Nature Geoscience, v. 6, p. 485-491, doi:10.1038/ngeo1823.

Endal, A. S., and S. Sofia, 1981, Rotation in solar-type stars, I, Evolutionary models for the spin-down of the Sun: Astrophysical Journal, v. 243, p. 625-640.

Field, C. B., M. J. Behrenfeld, J. T. Randerson, and P. Falkowski, 1998, Primary Production of the Biosphere: Integrating Terrestrial and Oceanic Components: Science, v. 281, 10 Jul. 1998, accessed Nov. 7, 2016, http://science.sciencemag.org/content/281/5374/237.

Freeman, K. H., and J. M. Hayes, 1992, Fractionation of carbon isotopes by phytoplankton and estimates of ancient CO2 levels: Global Biogeochemical Cycles, v. 6, p. 185-198.

Gyllenhaal, E. D., 1991, How accurately can paleo-precipitation and paleoclimatic change be interpreted from subaerial disconformities?: University of Chicago, Ph.D. thesis, pp. 529.

Harris, B. N., ed., 2005. The deposition of organic-carbon-rich sediments: Models, mechanisms and consequences: SEPM Special Publication 82, pp. 282.

Holligan, P. M., 1989, Primary productivity in the shelf seas of northwest Europe: Advances in Botanical Research, v. 16, p. 194-252.

Katz, B. J., 2005, Controlling factors on source rock development—A review of productivity, preservation, and sedimentation rate, in N. B. Harris, ed., The deposition of organic carbon-rich sediments: Models, mechanisms and consequences: SEPM Special Publication 82, p. 7-16.

Kearey, P., K. A. Klepeis and F. J. Vine, 2009, Global tectonics Third Edition: Wiley-Blackwell. pp. 482.

Kenrick, P., and P. Crane, 1997, The origin and early evolution of plants on land: Nature, v. 389, 4 Sep. 1997, p. 33-39.

Kruijs, E., and E. Barron, 1990, Climate model prediction of paleoproductivity and potential source-rock distribution, in A. Y. Huc, ed., Deposition of organic facies: AAPG Studies in Geology 30, p. 195-216.

Lees, A., 1975, Possible influences of salinity and temperature on modern shelf carbonate sedimentation: Marine Geology, v. 13, p. M67-M73.

Martin, J. H., G. A. Knauer, D. M. Karl, and W. W. Broenkow, 1987, VERTEX: Carbon cycling in the northeast Pacific: Deep-Sea Research, v. 34, p. 267-285.

Miller, R. G., 1989, Prediction of ancient coastal upwelling and related source rocks from palaeo-atmospheric pressure maps: Marine and Petroleum Geology, v. 6, p. 277-283.

Müller, R. D., W. R. Roest, J. Y. Royer, L. M. Gahagan, and J. G. Sclater, 1997, Digital isochrons of the world's ocean floor: Journal of Geophysical Research, v. 102, p. 3211-3214.

Palmer, J. R., and I. J. Totterdell, 2001, Production and export in a global ocean ecosystem model: Deep-Sea Research part I, v. 48 (2001), p. 1169-1198

Parrish, J. T., 1982, Upwelling and petroleum source beds, with reference to Paleozoic: AAPG Bulletin, v. 66, p. 750-774.

Parrish, J. T., 1998, Interpreting pre-Quaternary climate from the geologic record: Columbia University Press. pp. 348.

Parrish, J. T., and R. L. Curtis, 1982, Atmospheric circulation, upwelling, and organic-rich rocks in the Mesozoic and Cenozoic eras: Palaeogeography, Palaeoclimatology, Palaeoecology, v. 40, p. 31-66.

Pearson, P. N., and M. R. Palmer, 2000, Declining atmospheric carbon dioxide in the last sixty million years: Nature, v. 406, p. 695-699.

Rao, K. H., A. Smitha, and M. M. Ali, 2006, A study on cyclone induced productivity in south-western Bay of Bengal during November-December 2000 using MODIS (SST and chlorophyll-a) and altimeter sea surface height observations: Indian Journal of Marine Sciences, v. 35(2), June 2006, p. 153-160.

ROBERTSON (UK) LIMITED, 2014, Plate Wizard: A Phanerozoic Plate Reconstruction Tool: CGG, accessed Nov. 7, 2016, http://www.cgg.com/en/What-We-Do/Multi-Client-Data/Geological/Plate-Wizard.

Royer, D. L., 2006, CO2-forced climate thresholds during the Phanerozoic: Geochimica et Cosmochimica Acta, v. 70, p. 5665-5666.

Royer, L., R. A. Berner, I. P. Montanez, N. J. Tabor, and D. J. Beerling, 2004, CO2 as a primary driver of Phanerozoic climate: Geological Society of America Today, v. 14, no. 3, p. 4-10.

Scotese, C. R., and C. P. Summerhayes, 1986, Computer model of paleoclimate predicts coastal upwelling in the Mesozoic and Cainozoic: Geobyte, v. 1, p. 28-42.

SEAWIFS, 2014, Sea-viewing Wide Field-of-view Sensor Project: NASA, accessed Nov. 7, 2016, oceancolor.gsfc.nasa.gov/SeaWiFS/.

Summerhayes, C. P., 1983, Sedimentation of organic matter in upwelling regimes, in J. Thiede and E., Suess, eds., Coastal upwelling: Its sediment record, Part B: Sedimentary records of ancient coastal upwelling: Plenum Press, New York, p. 29-72.

Summerhayes, C. P., 2015, Earth's climate evolution: Wiley-Blackwell in association with the Scott Polar Institute, pp. 416.

Takahashi, M., Y. Yasuoka, M. Watanabe, T. Miyazaki, and S. Ichimura, 1981, Local upwelling associated with vortex motion off Oshima Island, Japan, in F. A. Richards, ed., Coastal upwelling: American Geophysical Union, p. 119-124.

Tripathy, M., Raman, M., Chauhan, P. and Ajai, 2014. Modulation in ocean primary production due to variability of photosynthetically available radiation under different atmospheric conditions. Int. J. Oceanography, v. 2014, p. 1-12.

Tucker, M. E. and V. P. Wright, 1991, Carbonate sedimentology: Blackwell Scientific, pp. 496.

Tsuchiya, K., T. Toshiki, R. Nakajima, H. Miyaguchi, V. S. Kuwahara, S. Taguchi, T. Kikuchi, and T. Toda, 2013, Typhoon-driven variations in primary production and phytoplankton assemblages in Sagami Bay, Japan: A case study of typhoon Mawar (T0511): Plankton and Benthos Research, v. 8, no. 2, p. 74-87.

Tyson, R. V., 2005, The 'productivity versus preservation' controversy: Cause, flaws and resolution, in N. B. Harris, ed., The deposition of organic-carbon-rich sediments: Models, mechanisms and consequences: SEPM Special Publication 82, p. 17-33.

What is claimed is:

1. A method for estimating a spatial distribution of a characteristic associated with Earth resources, the method comprising:
    receiving at an interface palaeogeography data including (1) palaeotopography data, (2) palaeobathymetry data, (3) and a palaeo-earth systems model;
    calculating with a processor, a retrodictive model of the characteristic based on the (1) palaeotopography data, (2) the palaeobathymetry data, and (3) the palaeo-earth systems model; and
    imaging the spatial distribution of the characteristic over at least a part of the Earth,
    wherein the calculating includes estimating gravitational resedimentation in deep water based on bathymetric mapping and organic matter flux prediction.

2. The method of claim 1, wherein the characteristic is related to source rocks, which are rocks from which hydrocarbons have been generated or are capable of being generated.

3. The method of claim 1, wherein the palaeotopography data and the palaeobathymetry data are used as boundary conditions for the palaeo-earth systems model.

4. The method of claim 1, wherein the step of calculating comprises:
    estimating an upwelling productivity of the entire Earth over a geologic time.

5. The method of claim 1, wherein the step of calculating comprises:
    estimating a storm productivity of organic matter in the photic zone of the sea.

6. The method of claim 1, wherein the step of calculating comprises:
    estimating a decay of organic matter during settling in a water column.

7. The method of claim 1, wherein the step of calculating comprises:
    estimating a tidal bed stress for limiting a shallow marine area on which marine organic matter accumulates.

8. The method of claim 1, wherein the step of calculating comprises:
    estimating a carbonate auto-dilution that reflects benthonic carbonate production in shallow marine areas.

9. The method of claim 1, wherein the step of calculating comprises:
    estimating an upwelling productivity of the entire Earth over a geologic time;
    estimating a storm productivity of organic matter underwater;
    estimating a decay of organic matter during settling in a water column;
    estimating a tidal bed stress for limiting a shallow marine area on which marine organic matter accumulates; and
    estimating a carbonate auto-dilution that reflects benthonic carbonate production in the shallow marine areas.

10. The method of claim 9, further comprising:
    estimating oceaning oxygen concentration, circulation and exchange with atmosphere.

11. A computing device for estimating a spatial distribution of a characteristic associated with Earth resources, the computing device comprising:
- an interface for receiving palaeogeography data including (1) palaeotopography data, (2) palaeobathymetry data, (3) and a palaeo-earth systems model; and
- a processor connected to the interface and configured to,
- calculate a retrodictive model of the characteristic based on the (1) palaeotopography data, (2) the palaeobathymetry data, and (3) the palaeo-earth systems model, and
- image the spatial distribution of the characteristic over a part of the Earth,
- wherein when calculating the retrodictive model the processor estimates gravitational resedimentation in deep water based on bathymetric mapping and organic matter flux prediction.

12. The computing device of claim 11, wherein the characteristic is related to source rocks, which are rocks from which hydrocarbons have been generated or are capable of being generated.

13. The computing device of claim 11, wherein the palaeotopography data and the palaeobathymetry data are used as boundary conditions for the palaeo-earth systems model.

14. The computing device of claim 11, wherein the processor is further configured to:
- estimate an upwelling productivity of the entire Earth over a geologic time.

15. The computing device of claim 11, wherein the processor is further configured to:
- estimate a storm productivity of organic matter in the photic zone of the sea.

16. The computing device of claim 11, wherein the processor is further configured to:
- estimate a decay of organic matter during settling in a water column.

17. The computing device of claim 11, wherein the processor is further configured to:
- estimate a tidal bed stress for limiting a shallow marine area on which marine organic matter accumulates, and
- estimate a carbonate auto-dilution that reflects benthonic carbonate production in shallow marine areas.

18. The computing device of claim 11, wherein the processor is further configured to:
- estimate an upwelling productivity of the entire Earth over a geologic time;
- estimate a storm productivity of organic matter underwater;
- estimate a decay of organic matter during settling in a water column;
- estimate a tidal bed stress for limiting a shallow marine area on which marine organic matter accumulates; and
- estimate a carbonate auto-dillution that reflects benthonic carbonate production in the shallow marine areas.

19. A non-transitory computer readable medium including computer executable instructions, wherein the instructions, when executed by a computer, implement a method for estimating a spatial distribution of a characteristic associated with Earth resources, the method comprising:
- receiving at an interface palaeogeography data including (1) palaeotopography data, (2) palaeobathymetry data, (3) and a palaeo-earth systems model;
- calculating with a processor, a retrodictive model of the characteristic based on the (1) palaeotopography data, (2) the palaeobathymetry data, and (3) the palaeo-earth systems model; and
- imaging the spatial distribution of the characteristic over a part of the Earth, wherein the calculating includes estimating gravitational resedimentation in deep water based on bathymetric mapping and organic matter flux prediction.

* * * * *